United States Patent
Wu et al.

(10) Patent No.: US 12,209,947 B2
(45) Date of Patent: Jan. 28, 2025

(54) OPTICAL SYSTEM AND FLOW CYTOMETER

(71) Applicant: THERMO FISHER SCIENTIFIC (SHANGHAI) INSTRUMENTS CO., LTD., Shanghai (CN)

(72) Inventors: Shenghai Wu, Shanghai (CN); Bin Hu, Shanghai (CN); Xiaoxian Guo, Shanghai (CN)

(73) Assignee: Thermo Fisher Scientific (Shanghai) Instruments Co., Ltd., Shanghai (CN)

( * ) Notice: Subject to any disclaimer, the term of this patent is extended or adjusted under 35 U.S.C. 154(b) by 261 days.

(21) Appl. No.: 17/292,174

(22) PCT Filed: Nov. 11, 2019

(86) PCT No.: PCT/CN2019/116999
§ 371 (c)(1),
(2) Date: May 7, 2021

(87) PCT Pub. No.: WO2020/094148
PCT Pub. Date: May 14, 2020

(65) Prior Publication Data
US 2021/0389229 A1 Dec. 16, 2021

(30) Foreign Application Priority Data
Nov. 9, 2018 (CN) .......................... 201811331628.4

(51) Int. Cl.
*G01N 15/1434* (2024.01)
*G01N 15/14* (2024.01)
(Continued)

(52) U.S. Cl.
CPC ..... *G01N 15/1434* (2013.01); *G01N 15/1459* (2013.01); *G02B 27/0927* (2013.01); *G02B 27/30* (2013.01); *G01N 2015/1006* (2013.01)

(58) Field of Classification Search
None
See application file for complete search history.

(56) References Cited

U.S. PATENT DOCUMENTS

| 5,283,694 A | 2/1994 | Frady |
| 5,737,078 A * | 4/1998 | Takarada ........... G01N 15/1459 356/336 |

(Continued)

FOREIGN PATENT DOCUMENTS

| CN | 101236150 A | 8/2008 |
| CN | 104075978 A | 10/2014 |

(Continued)

OTHER PUBLICATIONS

Wang, Dong, Jian Zhang, and Hongxin Zhang. "Adaptive-weight iterative algorithm for flat-top laser beam shaping." Optical Engineering 51.7 (2012): 074301-074301. (Year: 2012).*

(Continued)

*Primary Examiner* — Rufus L Phillips
(74) *Attorney, Agent, or Firm* — BakerHostetler

(57) ABSTRACT

An optical system is provided which comprises: a light source (1) for emitting light beam; an optical main axis; an optical shaping element (2) for shaping a light beam facing the light source (1) and directly adjacent to the light source (1), wherein the optical shaping element (2) includes a first freeform surface facing the light source (1), the light beam is shaped by means of the first freeform surface of the optical shaping element (2) in such a way that light intensity of the light beam has a flat-top profile on a first axis which is perpendicular to the optical main axis. With this optical system, a desirable light intensity profile can be achieved by using only a single optical element. Moreover, a flow cytometer including this optical system is provided.

3 Claims, 21 Drawing Sheets

(51) Int. Cl.
*G02B 27/09* (2006.01)
*G02B 27/30* (2006.01)
*G01N 15/10* (2006.01)

(56) References Cited

U.S. PATENT DOCUMENTS

| | | | | |
|---|---|---|---|---|
| 2001/0043409 | A1* | 11/2001 | Otomo | G02B 9/34 |
| | | | | 359/764 |
| 2008/0186490 | A1* | 8/2008 | Chu | G01N 15/1434 |
| | | | | 362/257 |
| 2011/0235030 | A1* | 9/2011 | Champseix | G01N 15/14 |
| | | | | 356/243.2 |
| 2011/0270585 | A1* | 11/2011 | Chen | G02B 27/30 |
| | | | | 703/1 |
| 2014/0264097 | A1 | 9/2014 | Heanue et al. | |
| 2015/0009583 | A1* | 1/2015 | Suleski | G02B 27/0927 |
| | | | | 359/717 |
| 2015/0077869 | A1* | 3/2015 | Meng | G02B 27/0966 |
| | | | | 359/837 |
| 2016/0025611 | A1 | 1/2016 | Fujiwara et al. | |
| 2017/0082861 | A1 | 3/2017 | Xu et al. | |
| 2020/0379270 | A1* | 12/2020 | Kent | G01J 3/189 |

FOREIGN PATENT DOCUMENTS

| | | |
|---|---|---|
| CN | 104252043 A | 12/2014 |
| CN | 104969055 A | 10/2015 |
| CN | 106019608 A | 10/2016 |
| CN | 106168712 A | 11/2016 |
| CN | 207133521 U | 3/2018 |
| CN | 108646422 A | 10/2018 |
| CN | 109357992 A | 2/2019 |
| JP | 2007-192835 A | 8/2007 |

OTHER PUBLICATIONS

Ma, Haotong, et al. "Generation of flat-top beam with phase-only liquid crystal spatial light modulators." Journal of optics 12.4 (2010): 045704. (Year: 2010).*
International Patent Application No. PCT/CN2019/116999; Int'l Search Report and Written Opinion; dated Jan. 23, 2020; 10 pages.
Steinkamp, "Lasers and Optics in Flow Cytometry", Optics & Photonics News, vol. 3(10), pp. 41-44, 1992.
Shealy, "Geometrical methods", In "Laser Beam Shaping, Theory and Techniques", Chapter 4, IV. A: "Two Plano-convex Lens systems", Dec. 31, 2000.

* cited by examiner

OPTICAL SYSTEM AND FLOW CYTOMETER

CROSS-REFERENCE TO RELATED APPLICATIONS

This application is the National Stage Application of International Patent Application No. PCT/CN2019/116999 (filed Nov. 11, 2019), which claims priority to and the benefit of Chinese patent application no. 201811331628.4 (filed Nov. 9, 2018), the entireties of which applications are incorporated herein by reference for any and all purposes.

TECHNICAL FIELD

The present disclosure relates to optical systems for shaping light beams. Furthermore, the present disclosure relates to certain embodiments with flow cytometers comprising such an optical system of the present disclosure.

BACKGROUND

Since the 1970s, flow cytometry has been gradually developed into a combined technology of computer science, laser technology, fluid mechanics, cell chemistry and cellular immunology etc., which has functions of analyzing and screening cells. Flow cytometry relates to detection means for quantitatively analyzing and screening individual cells or particles at a functional level while in a fluid stream.

Currently, it is known that various flow cytometer instruments have been developed for use in flow cytometry to identify various types of cells and biological fluids. Existing flow cytometers have an optically transparent flow cell which contains a cell sample inlet, a sheath fluid inlet, and a channel/passage through which cells can pass, i.e., a flow channel. A cell sample is concentrated by a sheath fluid concentrically surrounding the cell sample to the center of the flow channel and flows in this flow channel. A laser beam is focused at the center of the flow channel. When cells pass through the laser irradiation region, photons are scattered at different angles depending on size, shape and refractive index of the cells.

In addition, different functional groups on cells are labeled with different fluorescent labels, and the different fluorescent labels generate fluorescence of different wavelengths under laser radiation, such that the type of cells through which the laser beam passes can be determined according to the wavelength and intensity of the fluorescence. As such, for each cell, in addition to the scattered light, a plurality of photodetectors may be used to detect the fluorescence according to different wavelengths, whereby the cells can be analyzed from various aspects.

Flow cytometers with high-resolution, high-sensitivity, and high-throughput place higher requirements on intensity of the light beam of the optical system thereof and the spatial profile of light intensity. In order to achieve high sensitivity, it is a suitable choice to use a laser light source with features in terms of high brightness, monochromaticity and coherence etc.

Moreover, in order to achieve high resolution, the time that the cells pass through the laser beam at the same flow rate should be minimized which requires the laser beam with a narrow light intensity profile and a high center intensity in an axial section of the flow channel, such as a Gaussian profile of light intensity. Still further, in the case of high throughput, in order to obtain uniform light irradiation of the cells across the cross section of the flow channel of the flow cell, it is necessary to make the light intensity profile of the laser beam wide and uniform on its cross-section, such as a flat-top profile of light intensity.

At present, use of a diffractive optical device or a combination of two or more non-diffractive optical devices may form a laser beam that approximately satisfies or satisfies the above requirements, such as a linear laser beam, or a laser beam with a flat-top shape along an x-axis and a Gaussian shape along y-axis. However, merely with prior optical shaping components, demand on desirable shape of the light beam cannot be satisfied. To remedy this, auxiliary optics need to be added in the system with result of complex assembly and large volume of the entire optical system, which is detrimental to mass production, cost optimization, and compactness of instruments.

For this reason, in the case that flow cytometers with high-resolution, high-sensitivity, and high-throughput place specific requirements on intensity of the light beam of an optical system and on shape of spatial profile of light intensity, there always remains need in the field of optics to provide an optical system which is compact, easy to assemble, and cost effective.

Further, in addition to achieving desirable profile of light intensity for an optical system in a cost-effective way, there's need to provide an optical system which is simpler to design and has more flexibility in selection of optical lens in field of optics.

Moreover, in the field of optics, especially an optical system used in flow cytometers, there's need to improve reusability of optics and provides greater flexibility than known optics combinations.

SUMMARY

In a first aspect, the present disclosure provides an optical system, the optical system comprising: a light source for emitting light beam; an optical main axis; an optical shaping element for shaping a light beam which faces the light source and is directly adjacent to the light source, wherein the optical shaping element includes a first freeform surface facing the light source, the light beam is shaped by means of the first freeform surface of the optical shaping element in such a way that light intensity of the light beam has a flat-top profile along a first axis which is perpendicular to the optical main axis.

With the above optical system of the present disclosure, a laser beam from a laser diode or a hybrid optical device can be shaped, by using only a single optical device, i.e., using a freeform surface of an optical shaping element, in such a way that the profile of light intensity of the laser beam is flat-top shaped along an axis, thereby providing uniform irradiation of cells in a flow cytometer across the cross section of a flow channel. The uniform profile of light intensity may allow cells to deviate from a central axis of the flow channel or from a main axis (i.e. optical main axis) of the light beam when flowing through the flow channel without causing signal degradation. Since, in the case of high throughput, cells tend to deviate from the central axis of the flow channel, the optical system of the present disclosure is more suitable for high-throughput flow cytometers.

Preferably, the light beam is shaped by means of the first freeform surface of the optical shaping element in such a way that light intensity of the light beam has a Gaussian profile on/along a second axis which is perpendicular to both the optical main axis and the first axis.

With the thus-shaped light beam, cells in the flow channel of the sample flow cell of the flow cytometer can pass through the cross section of the flow channel formed by the light beam at the fastest speed because on the axial section of the flow channel, the light intensity profile is narrow and the intensity at the center is high, so that the time required for the cells to pass through the cross section of the flow channel is significantly shortened, which may further increases resolution in cell size(s).

Advantageously, the optical system may further include an optical focusing element which is arranged after the optical shaping element along the optical main axis for focusing the light beam shaped by the optical shaping element to a designated area, for example to the center of the flow channel of the flow cell. In this way, it is possible to focus the shaped light beam that is still relatively large in size to a desired relatively small area (e.g., the cross-sectional area at a designated position on the main axis is on an order of 0.1 mm×0.01 mm) The light intensity per unit volume of the laser beam within the flow channel is increased, thus further increasing the cell detection sensitivity.

More preferably, the optical focusing element may include concave lens and convex lens in pairs, wherein in a direction of the optical main axis, the concave lens is arranged more proximate to the optical shaping element than the convex lens, and the convex lens is located between the concave lens and the designated area. Especially, the concave lens and/or the convex lens may be further configured as compound lens. Preferably, the concave lens and the convex lens may be combined as doublet lens. In this way, an optical focusing element of a very compact structure can be obtained.

Moreover, the shape of the first freeform surface of the optical shaping element of the optical system may be, at least, determined by the wavelength and divergence angle of the light beam. This enables different optical shaping elements to match different light sources, such as lasers.

In an embodiment, the first freeform surface of the optical shaping element of the optical system is configured in such a way that a light ray passing through a point S (X, y, $Z_0$) in an incident plane $Z_0$ also passes through a point S'(X', y, $Z_0$') in a designated plane $Z_0$', wherein relationship of the point S (X, y, $Z_0$) and the point S'(X', y, $Z_0$') meets following equation:

$$\int_0^X I(x, y)dx = \int_0^{X'} R(x, y)dx$$

where $I(x, y) = H(z_0) \cdot e^{\frac{-2x^2}{\omega_x^2(z_0)}} \cdot e^{\frac{-2y^2}{\omega_y^2(z_0)}}$, $H(z_0) = \frac{2P}{\pi \omega_x(z_0) \omega_y(z_0)}$, $R(x, y) = T \cdot \varphi(x) e^{\frac{-2y^2}{\omega_y^2(z_0')}}$, $\varphi(x) = \begin{cases} 1, -a \le x \le a \\ 0, x > a \text{ or } x < -a \end{cases}$, $T = \frac{P}{\sqrt{2\pi} \, \omega_y(z_0')}$.

The thus-designed first freeform surface of the optical shaping element can be adapted to specified divergence angle and specified wavelength.

Particularly, light passing through the optical shaping element along the optical main axis may be collimated light.

In addition, the light source may be particularly a light source in the form of a laser light source or an LED light source etc. to provide an optimal light beam depending on conditions of the flow cytometer.

In some cases, although there are no other optical devices, particularly optical collimating elements, between the light source and the optical shaping element according to the present disclosure, the optical shaping element itself can be used as an optical collimating element. As an example, the optical shaping element may further include a second surface facing away from the light source such that light passing through the second surface along the optical main axis is collimated. In this way, the collimated light beam can be realized while being shaped with a very compact structure.

In a further aspect, the present disclosure further provides a flow cytometer, comprising: a flow cell; and an optical system as describe above, wherein the light beam emitted by the light source passes along the optical main axis of the optical system and through the flow cell.

The flow cytometer achieves very reliable detection results by providing desired uniform irradiation onto the cells, has a compact size, and is easy to assemble and install.

Advantageously, the flow cell includes a channel (for example, a tubular, elliptical, square or other suitable channel geometry) which is perpendicular to the optical main axis and the first axis. In this orientation, the signal intensity can be kept unchanged even when the cell deviates from the central axis of the channel or the main axis (i.e. optical main axis) of the light beam on one hand, and the cell can pass through the light beam at the fastest speed on the other hand, thereby significantly increasing the detection throughput and improving resolution of the flow cytometer.

Most preferably, the light source is a laser light source. The laser light source has outstanding features in terms of such as high brightness, monochromaticity and coherence, and can also allow a fluorescent label labeled on a cell functional group to generate fluorescence, thus facilitating detection of the cell functional group.

Particularly, the light source may be configured as a laser with an optical fiber.

BRIEF DESCRIPTION OF DRAWINGS

Other features and advantages of the present disclosure will become apparent from the detailed description with reference to the accompany drawings, in which:

FIGS. 19A-18B show graphs of profiles of light intensity distribution along the first axis and the second axis according to still yet another embodiment of FIG. 18 respectively.

Figure 1:
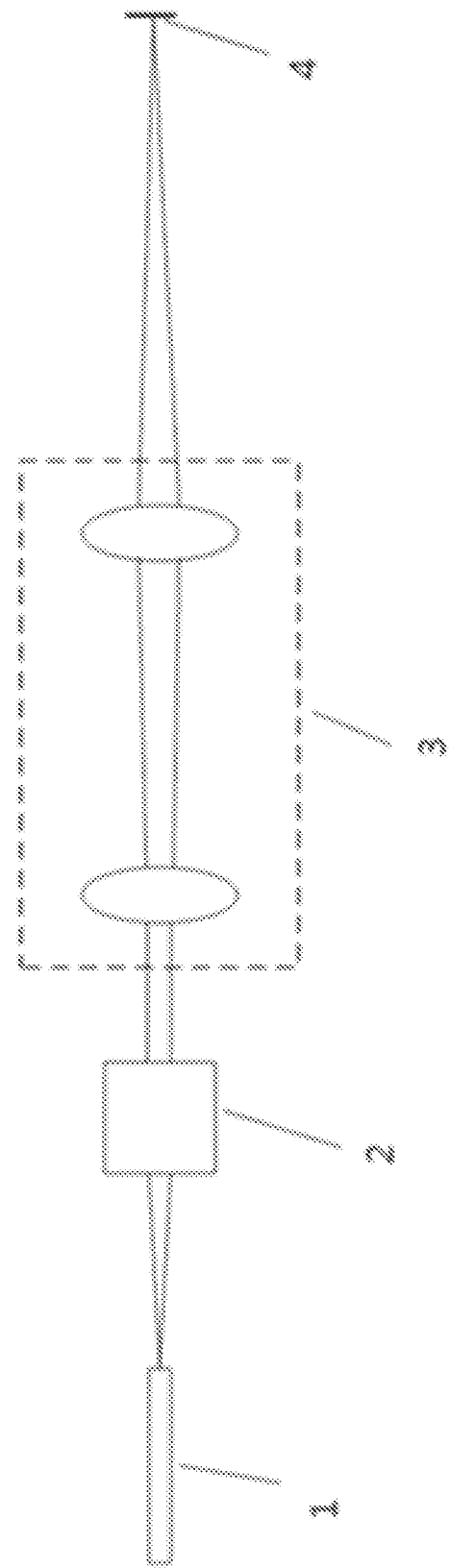
FIG. 1 schematically shows some components of an optical system according to the present disclosure, including an optical shaping element, an optical focusing element, etc.

It is noted that the accompany drawings are not necessarily drawn to scale, but may be expanded to illustrate various aspects of the present disclosure; and in this respect, the accompany drawings are not to be construed as limiting.

LIST OF REFERENCE NUMERALS 1 light source;
2 optical collimating element;
3 optical shaping element;
4 optical focusing element;
5 designated area/imaging plane;
6 optical shaping element;
7 optical focusing element;
8 (concave and convex) doublet lens;
9 (concave and convex) doublet lens;
10 designated area/imaging plane;
11 light source (laser);
12 optical shaping element;
13 (concave and convex) doublet lens;
14 (concave and convex) doublet lens;
15 optical focusing element;
16 designated area/imaging plane;
100 optical system.

DETAILED DESCRIPTION ON EMBODIMENTS

In the present disclosure, the optical system may be used in a flow cytometer, but may also be used in other cytological or non-cytological applications in the biological field, and may even be used in many other applications including air particulate matter detection, particulate matter detection in liquids, laser processing (micro-processing), digital holography, night vision and distance measurement of a distant object, etc.

Furthermore, the term "optical system" in context of the present disclosure may include portions corresponding to the light source and/or the object to be measured. Alternatively at least a portion of the light source and/or the object to be measured may be excluded depending on the actual applications.

Optical system 100 in accordance with the present disclosure includes various optical components for varying beam properties of a beam of light (emitted from a source), such as, but not limited to, optical components for shaping a beam, for focusing a beam, and the like.

In the following, if the light beam emitted from the light source is irradiated along the optical main axis thereof, the optical main axis may be, for example, the z-axis (i.e., the horizontal axis as shown) in the Cartesian coordinate system shown in FIG. 7.

The optical main axis generally extends through the respective optical centers of subsequent optical components, such as an optical shaping element, an optical focusing element, and the like. It will be appreciated, however, that since the optical collimating element may be a reflection mirror (off-axis or non-off-axis), the optical main axis generally refers to an axis that has been redirected by the reflection mirror and extends through the respective optical centers of subsequent optical components.

In the present disclosure, it is understood that the light source may be integrated in the optical system. The optical system, as a module, may be applied to a flow cytometer or other instrument requiring a light beam to be shaped. But it cannot be excluded from the scope of the present disclosure that the light source may be separately provided as a part of the optical system. A modular approach provides potential benefits such as the ability to exchange one module (with a first light source and associated beam shaping optics) for a second module (that may have either a different light source or different associated beam shaping optics, or both).

Advantageously, the light source according to the present disclosure is a laser light source (e.g., from a laser diode) because it typically has outstanding features in terms of such as high brightness, monochromaticity and coherence. Of course, the light source may also be integrated into the optical system.

In the present disclosure, the term "flat-top profile" may mean that the intensity of the flat-top region of the light intensity has a relative variation range (i.e., a ratio of difference between the maximum light intensity and the minimum light intensity to the average light intensity in this region) of less than about 10%, while a ratio of the light intensity within the flat-top region to the total light intensity on the corresponding axis is greater than about 30%, but "flat-top profile" may not be limited to those patterns which meet these two conditions.

In the present disclosure, the term "spot radius" refers to half of the intensity distribution width with 1/e threshold when the light intensity is projected on the first axis or the second axis, wherein "e" is a natural index.

In the present disclosure, the term "doublet lens" is a general term in optics, refers to two lens glued together, where for example there is one concave and one convex glued together, or two concave glued together, or two convex glued together etc.

As shown in FIG. 1, a light beam is irradiated from the light source 1 into the optical system of the present disclosure. The optical device adjacent to the light source 1 in a direction of the optical main axis is an optical shaping element 3 for shaping the light beam. It can be seen in this embodiment that the optical shaping element 3 is located directly adjacent to the light source 1.

Herein, the term "directly adjacent" means that there is no other intermediate optical device (for example, an optical device for collimation) between the two, that is, the light beam does not change its optical properties when propagating forward between the two.

Figure 6:
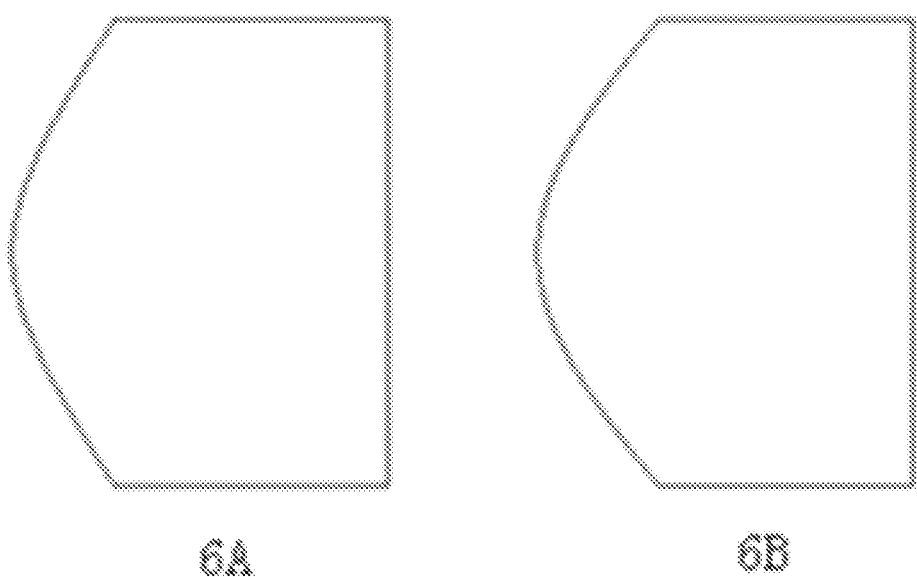
FIG. 6 schematically shows two possible first freeform surfaces of the optical shaping element of the optical system according to the present disclosure.

As schematically shown in FIG. 6, the optical shaping element 3 (e.g., an optical shaping lens) according to the present disclosure may include at least a first freeform surface which faces the light source 1. Therefore, the first freeform surface is the surface of the optical device that is first reached by the light beam after being emitted from the light source.

The term "freeform surface" is generally used to describe appearance of a three-dimensional geometric element in for example CAD and other computer graphics software. Unlike conventional surfaces such as (flat) planes, cylindrical surfaces, and conical surfaces, freeform surfaces generally do not have a solid radial dimension. In the present disclosure, the term "freeform surface" refers to an optical device surface that can be artificially and freely designed to conform the output light beam passing therethrough to the specific requirements, particularly a freely designable three-dimensional surface.

Figure 7:
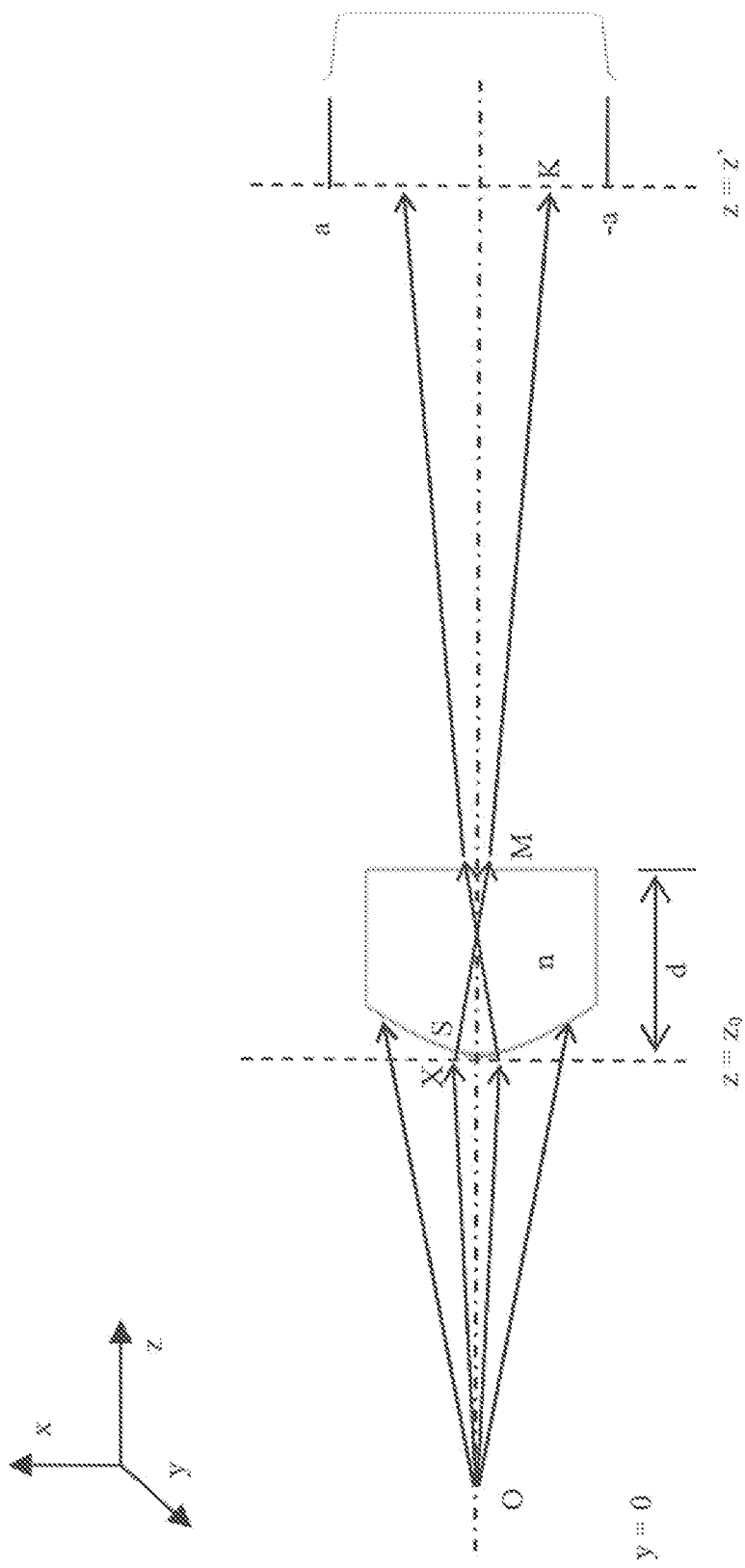
FIG. 7 schematically shows an exemplary optical path of a light beam propagating from a light source along the optical main axis of the optical shaping element according to the present disclosure.

As shown in FIG. 7, assuming that the optical main axis is in the direction of the z-axis, the x-axis and the y-axis form a plane perpendicular to the direction of the optical main axis. With the first freeform surface of the optical shaping element 3 according to the present disclosure, the light beam may be shaped in such a way that the light intensity profile of the shaped light beam on/along a first axis is flat-top shaped which axis is perpendicular to the optical main axis. The first axis may be any axis in the plane, including, but not limited to, the x-axis. For convenience of explanation below, it can be assumed that the first axis is the x-axis shown in FIG. 7.

Figure 5:
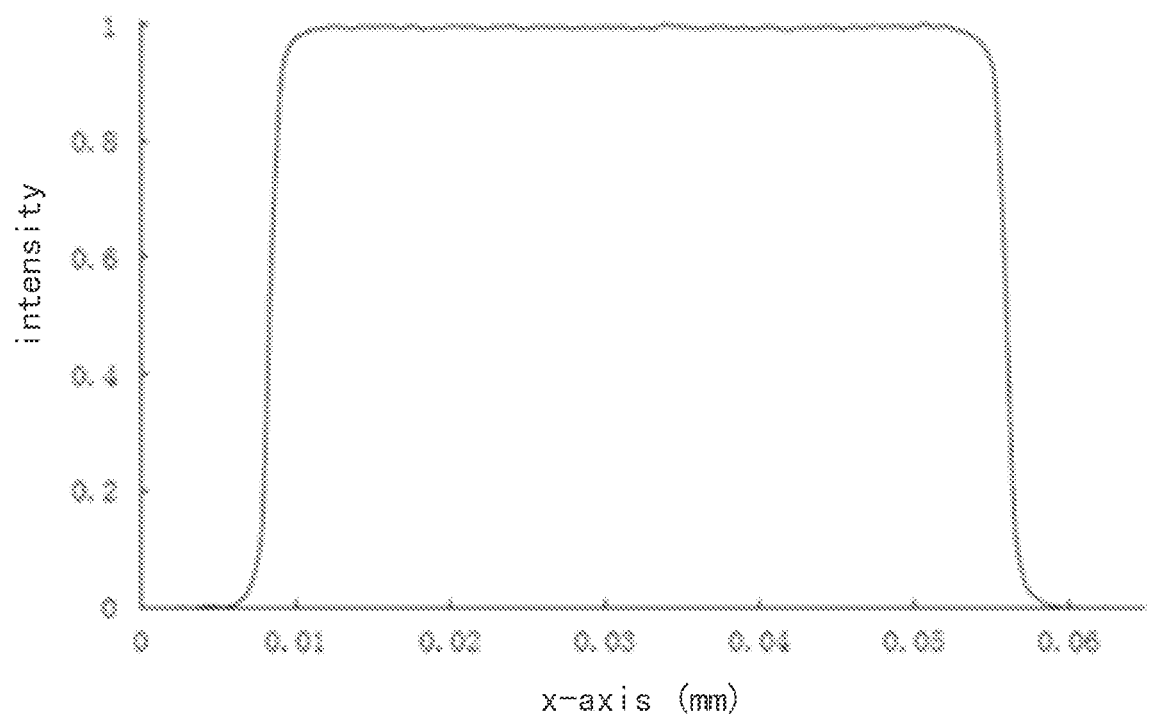
FIG. 5 schematically shows a light intensity profile of the light beam on/along a x-axis after passing through the optical shaping element of the optical system according to the present disclosure.

As shown in FIG. 5, when the first axis is the x-axis shown in FIG. 7 (coordinate values are in millimeters), the light intensity profile of the shaped light beam on the x-axis is substantially flat-top shaped. The light intensity profile shown on the ordinate axis in FIG. 5 is a normalized light intensity profile, that is, the maximum light intensity is set to 1, and the minimum light intensity is 0 (this process is also referred to as normalizing the light intensity). Herein, FIG. 5 clearly shows that the light intensity profile of the light beam on the x-axis exhibits a flat-top profile, i.e., the light intensity is uniform over a certain area and is close to 0 in the other areas (please see above definition in detail).

Figure 21:
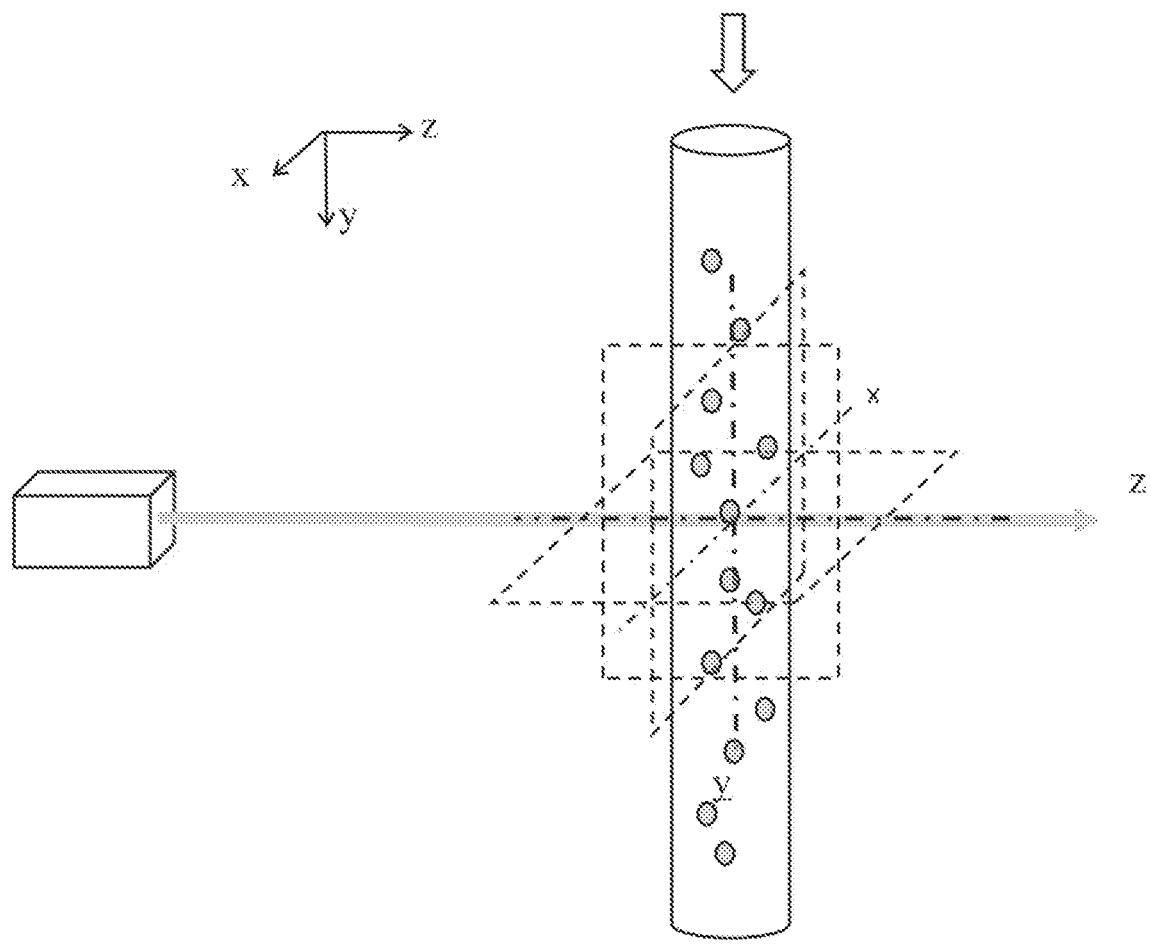

When the optical system of the present disclosure is applied to a flow cytometer, the flow cytometer may include a flow cell, and the light beam emitted from the light source 1 passes through the flow cell after being shaped by the optical system to irradiate cells in the flow cell. Preferably, the flow cell may comprise a channel (which may be of various cross-sectional shapes such as, but not limited to, square, circular etc.). The channel (shown in FIG. 21) may be sized to allow the cells to be detected, especially fewer cells, to pass therethrough.

In this case, by means of the aforementioned shaped light beam of the substantially flat-top light intensity profile, when the channel of the flow cell of the flow cytometer is oriented such that it is perpendicular to both the optical main axis (e.g., z axis) and the first axis (e.g., the x axis), the cells flowing in the channel can be irradiated by the light beam of uniform light intensity across the cross section of the channel.

When the cells pass through the light beam, one cell will generate one pulse signal to be detected. Therefore, the uniform profile of light intensity across the cross section of the channel can allow the intensity of the pulse signal to be unchanged or slightly changed as the cell deviates from the main axis of the channel or the main axis of the light beam (i.e. the optical main axis of the optical system). Thus, compared with the traditional irradiation of unshaped light beam, the cells in the flow cytometer will not cause signal attenuation even when they deviate from the central axis of the channel or the main axis of the light beam as they flow in the channel, which is thus more suitable for high-throughput flow cytometry.

More preferably, with the first freeform surface of the optical shaping element 3 according to the present disclosure, the light beam may be further shaped in such a way that there is a second axis, which is perpendicular to both the first axis and the optical main axis. The light intensity profile of the shaped light beam on the second axis is in shape of a Gaussian profile.

When the channel of the flow cell of the flow cytometer is oriented such that it is perpendicular to both the optical main axis (e.g., z axis) and the first axis (e.g., the x axis), the channel is oriented in the direction of the y-axis direction as shown in FIG. 7 or in a direction parallel to the y-axis. Therefore, in the shown embodiment, the second axis may be, for example, the y-axis. An example of orientation of such a channel with respect to the optical main axis (z-axis) is shown in detail in FIG. 21.

However, it should be understood that the first axis and the second axis described in the present disclosure may not necessarily be the x-axis (i.e., a vertical direction in the figures) and the y-axis (i.e., a direction perpendicularly passing through the drawing) shown in FIG. 7 as long as they are perpendicular to each other.

Figure 4:
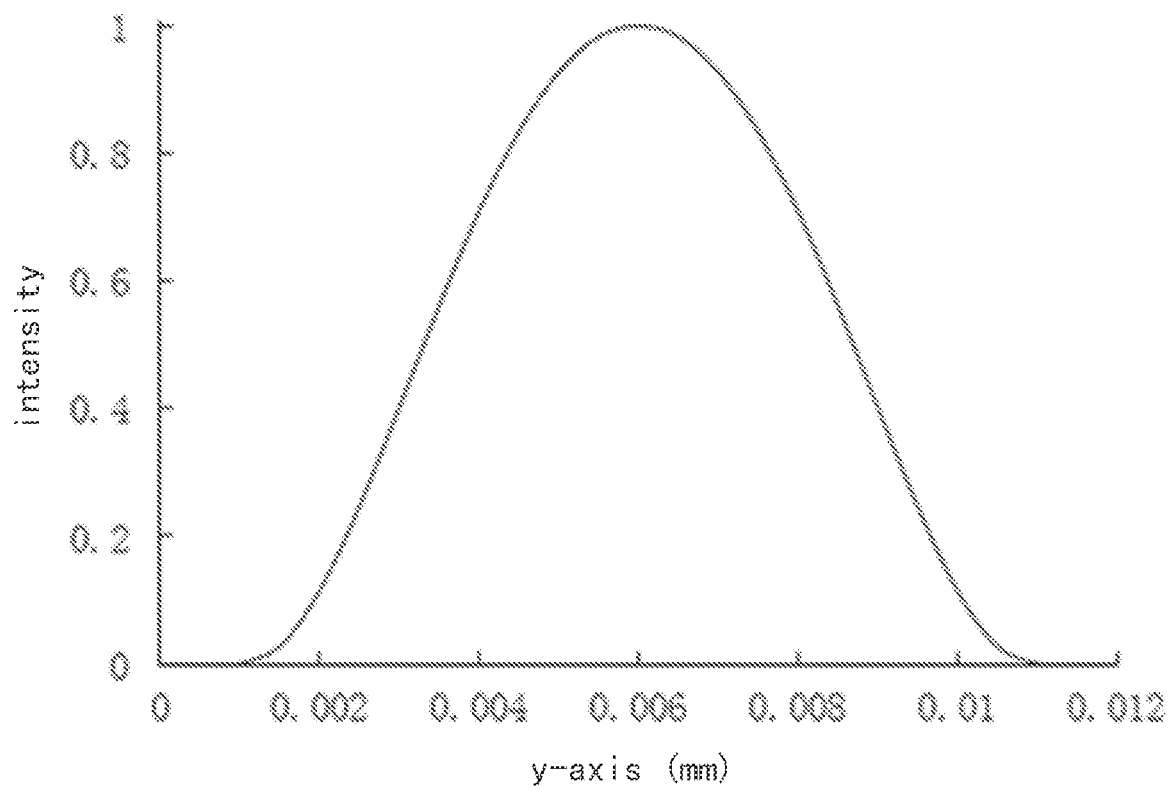
FIG. 4 schematically shows a light intensity profile of a light beam on/along an y-axis after passing through the optical shaping element of the optical system according to the present disclosure.

When the light intensity profile of the shaped light beam on/along the second axis (e.g., the y-axis) is a Gaussian profile (as best seen in FIG. 4), it can be understood that the light intensity is more concentrated/focused than the flat-top profile (the difference between the numerical values on the abscissa axis in FIGS. 4 and 5 can be read out), which causes the cells in the channel of the flow cell of the flow cytometer to pass through the laser beam at the fastest speed.

Similarly to FIG. 4, the numerical values on the abscissa axis in FIG. 5 are also in millimeters, and the numerical values on the ordinate axis are within the normalized range of 0-1.

In this way, in a preferred embodiment, the signal intensity can be kept unchanged when the cell deviates from the central axis of the channel or the main axis of the light beam (i.e. the optical main axis of the optical system), and the cell can also pass through the light beam at the fastest speed, thereby significantly increasing the detection throughput and resolution of the flow cytometer.

When the optical system is used in a flow cytometer, most of the laser will elastically collide with a surface of the object to be detected, i.e., a surface of the cell (such as a cell wall), thereby generating scattered light in various directions. The scattered light will be captured by a corresponding detection element in the flow cytometer or another device, and signals detected by the detection element may be converted into, for example, electrical signals for subsequent biological research analysis.

In addition, in certain specific applications, the surface of the object to be detected, e.g., the surface of the cell (such as the cell wall) is further labeled with a fluorescent marker. When the laser is irradiated onto the cell, the fluorescent marker absorbs a part of the laser and generates fluorescence, which is then easily detected by detection means.

In the following, it is specifically explained how the light intensity of a flat-top profile on one axis and of a Gaussian profile on another axis is achieved by means of design of the first freeform surface of the optical shaping element.

The optical shaping element 3 as shown in FIG. 6 is similar to a Powell lens, but its first freeform surface may be determined, i.e. modified, according to wavelength and divergence angle of a light beam, in particular of a laser light beam, irradiated from the light source 1. In other words, light sources (e.g., lasers) with different divergence angles and different wavelengths should use different optical shaping elements with different first freeform surfaces, wherein such optical shaping elements are described in the following equation:

$$F(x,y,z,\lambda,\Omega)=P(x,y,z)+\delta(x,y,z,\lambda,\Omega) \quad \text{Equation 1}$$

where F is a first freeform surface function in the Cartesian coordinate system (x, y, z), λ is wavelength of the light beam of the light source, Ω is a solid diverge angle of the light source (e.g., the laser), P is a surface function of the Powell lens, and δ is a surface correction function which is spatially continuous.

Two different first freeform surfaces are shown in FIG. 6. As an example, the optical shaping element on the left side of FIG. 6 may be used to match a laser with wavelength of, for example, 405 nm from an optical fiber, while the optical shaping element on the right side of FIG. 6 may be used to match a laser with wavelength of, for example, 488 nm in a free space.

A first freeform surface (a front surface) of the optical shaping element 3 according to an embodiment of the present disclosure can be designed according to FIG. 7. First, it is assumed that a light source (e.g., a laser light source or a LED source) having a power P is located at the origin of the coordinates: O (x, y, z)=(0, 0, 0) (e.g., it is actually located outside the optical system according to the present disclosure). The divergence angle of the light beam from the light source is ($\theta_x$, $\theta_y$), so the spot radius (as defined above) of the light beam is $\omega_x(z)=z\cdot\tan(\theta_x)$, $\omega_y(z)=z\cdot\tan(\theta_y)$. It is assumed that the front face of the optical shaping element 3 is perpendicular to z-axis and its vertex is at the point (0, 0, $z_o$) in the coordinate system.

Therefore, in an incident plane $z=z_0$, the light beam intensity can be expressed as:

$$I(x, y) = H(z_0)\cdot e^{\frac{-2x^2}{\omega_x^2(z_0)}}\cdot e^{\frac{-2y^2}{\omega_y^2(z_0)}} \quad \text{Equation 2}$$

where $H(z_0) = \frac{2P}{\pi\omega_x(z_0)\omega_y(z_0)}$, because $\oiint I(x, y)dxdy = P$.

In the receiving plane z=z', it is assumed that the light beam energy is of a flat-top profile along an axis of (y=0, z=z'), the light beam intensity can be expressed as:

$$R(x, y) = T\cdot\varphi(x)e^{\frac{-2y^2}{\omega_y^2(z')}} \text{ and } \varphi(x) = \quad \text{Equation 3}$$

$$\begin{cases} 1, -a \le x \le a \\ 0, x > a \text{ or } x < -a \end{cases} \text{ where } T = \frac{P}{\sqrt{2\pi}\,\omega_y(z_0)},$$

because $\oiint R(x, y)dxdy = P$(assuming that no energy loss occurs from the incident plane to the receiving plane).

In the cross section y=0, it can be obtained that $$\int_0^X I(x,0)dx = \int_0^K T\cdot\varphi(x)dx \quad \text{Equation 4}$$

By solving the above equations, the incident point (X, 0, $z_0$) for any receiving point (K, 0, z') can be found. The law of refraction can then be applied to the light beams OS (i.e., the light beam from point O to point S), SM (i.e., the light beam from point S to point M) and MK (i.e., the light beam from point M to point K) to obtain coordinates of the point S(x, 0, z), which is a point on the first freeform surface of the shaping optical element, wherein the point (X, 0, $z_0$) is on the light beam OS. By iterating K from −a to a, a curve function of z=f(x) for the first freeform surface of the optical shaping element 3 can be obtained.

To make an extension, on the various sectional planes perpendicular to the y-axis, it can be obtained that $$\int_0^{X'} I(x,y')dx = \int_0^{K'} R(x,y')dx \quad \text{Equation 5}$$

Therefore, a surface function of z=f(x, y) can be obtained.

The thus-designed first freeform surface of the optical shaping element 3 can be designed to be adapted to the specified divergence angle and the specified wavelength. If the divergence angle and the wavelength of the light source change, the first freeform surface of the optical shaping element 3 needs to be redesigned accordingly.

As described above, the optical shaping element 3 according to the present disclosure can form a desired light intensity profile at a distant position after the optical shaping element 3 (i.e., a flat-top profile on the first axis and a Gaussian profile on the second axis), but size of the light beam is still large.

For this reason, the optical system of the present disclosure further includes an optical focusing element facing the optical shaping element (e.g., directly adjacent thereto without any intermediate optical device), for focusing the light beam passing through the optical shaping element 3 to a designated area 4 (e.g., to a center of the channel of the flow cell of the flow cytometer) (i.e., a designated imaging surface).

In an embodiment as shown in FIG. 1, the light beam of the specified wavelength from a light source 1 reaches an optical shaping element 3, and the optical shaping element 3 shapes the light beam into the desired light beam. After the optical shaping element 3, the shaped light beam can reach an optical focusing element 4, such as a focusing lens, which can focus the shaped light beam on the imaging surface 5 at the designated area with decreased beam size (i.e., the light beam can exit the optical system from a rear surface, which surface is remote from the light source, of the last component of the optical focusing element).

Preferably, the optical focusing element (i.e. focusing optics) may include concave lens and convex lens in pairs. Advantageously, as seen in the direction of the optical main axis of the optical system, the concave lens is arranged more proximate to the optical shaping element than the convex lens, and the convex lens is located between the concave lens and the designated area. More advantageously, the convex lens and/or the concave lens according to the present disclosure may be configured as compound lens. For example, the convex lens and the concave lens may be configured doublet lens.

Also, the optical focusing element of the present disclosure may be a single aspheric lens, or a doublet spherical lens, a pair of doublets or complex lens groups.

Furthermore, when the light source is preferably designed as a laser light source, the light source may be a laser with an optical fiber or a laser in a free space (pls. see embodiments below for more details). In general, the light beam from the laser with an optical fiber (as a light source) has a relatively large divergence angle, while the light beam directly emitted from the laser in a free space has a relatively small divergence angle. Typically, the wavelength of the laser emitted by the laser is preferably between 400 nm and 800 nm.

Figure 2:
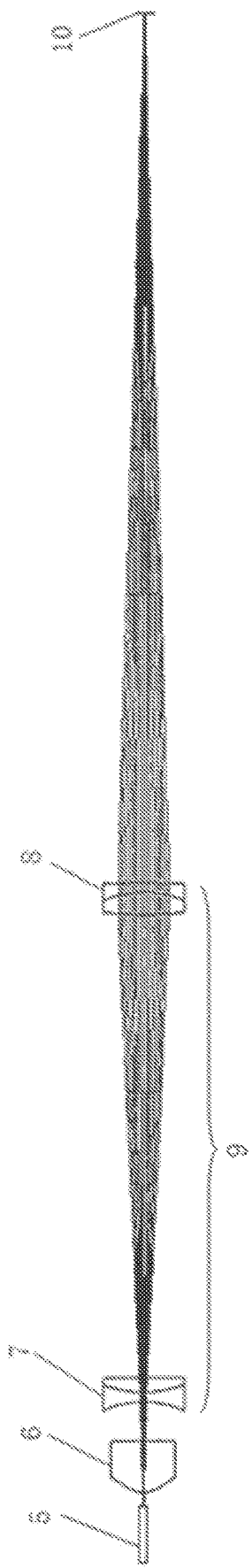
FIG. 2 schematically shows an embodiment of the optical system according to the present disclosure, wherein the laser is an optical fiber laser, and the optical focusing element includes concave lens and convex lens in pairs.

Firstly, in another embodiment as shown in FIG. 2, a light beam of a specified wavelength from a light source (e.g., a specific laser with an optical fiber) 5 reaches a first freeform surface of an optical shaping element 6. The optical shaping element 6 further shapes the large divergent laser beam into a moderate divergent light beam (i.e., the light intensity thereof is of a flat-top profile on one axis and of a Gaussian profile on another axis). The shaped light beam then preferably reaches the optical focusing element, which is configured as a double lens 7 and a double lens 8 in this embodiment. That is, the optical focusing element 9 is formed by combining the double lens 7 with the double lens 8. The optical focusing element 9 focuses the shaped light beam on the designated area/imaging plane 10 (e.g., on an order of 0.1 mm by 0.01 mm in size). It is to be understood that different optical shaping elements 6 for the light beam should match different optical fiber lasers.

Figure 3:
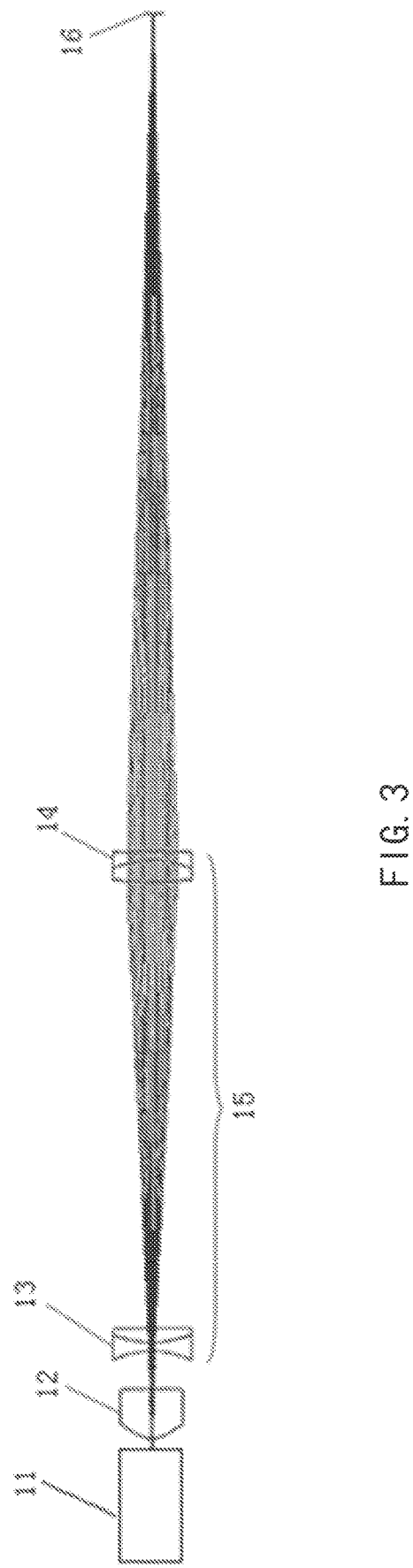
FIG. 3 schematically shows a further embodiment of the optical system according to the present disclosure, wherein the laser is a free-space laser (a laser in free space), and the optical focusing element includes concave lens and convex lens in pairs.

In the embodiment as shown in FIG. 3, a light beam with a specified wavelength from a light source in a free space (e.g., from a specified laser) 11 reaches a first freeform surface of an optical shaping element 12 (as previously described, the light intensity of the light beam passing through the first freeform surface can generate a flat-top profile on one axis and a Gaussian profile on another axis). The first freeform surface can be adjusted to adapt to the divergence angle of the laser in the free space. The shaped light beam reaches a doublet lens 13 and a doublet lens 14 after the optical shaping element 12. In this embodiment, an optical focusing element 15 is formed by combining the doublet lens 13 with the doublet lens 14. The optical focusing element 15 focuses the shaped light beam on a designated area 16. It is to be understood that different optical shaping elements 12 should match different specified lasers 11.

In addition, light rays are typically divergent, that is, initially adjacent but farther away from each other as they propagate. However, the term "collimation" herein refers to transforming the light beam into a light beam with a small divergence angle, wherein the divergence angle is small enough to be negligible in a specific application. The variation of the spot size of such collimated light over the applied distance can be negligible for this application. For example, in a flow cytometer, if the distance between the beam waist position of the laser after passing the optical shaping element (in absence of other optical elements) and the optical shaping element 12 is greater than 2 m, the light beam can be considered as collimated light beam. Alternatively, for example, also in a flow cytometer, if, after passing the optical shaping element 12 (in absence of other optical elements), the variation of the spot size is less than 10% when it is within 2 meters from the optical shaping element 12, the light beam can also be considered as collimated light beam. Different applications have different definitions of the laser beam waist distance or the variation of the spot. The present disclosure is not limited to those numerical values in the above examples, as long as the variation of the divergence angle or the spot size does not have any essential effect on the specific application (i.e. "collimation").

As described above, if, in some embodiments, there are no other optical devices, particularly optical collimating elements, between the light source and the optical shaping element according to the present disclosure, the optical shaping element per se may be used as an optical collimating element in such cases.

As an example, the light beam may be collimated after passing through the optical shaping element according to the present disclosure along the optical main axis. In a preferred embodiment, the optical shaping element according to the present disclosure may include a second surface which is a surface (opposite the first freeform surface) facing away from the light source, such that the light beam passing through the first freeform surface can still pass through the second surface and become a collimated light beam (i.e., collimated light) as it exits the optical shaping element.

Thus, the optical system for a flow cytometer according to the present disclosure on one hand satisfies the requirements of a light beam in used in a flow cytometer (e.g., capable of generating a shaped light beam of a substantially flat-top profile of light intensity on the first axis, but of a Gaussian profile of light intensity on the second axis perpendicular to the first axis). On the other hand, the number of optical devices required is extremely small, and the entire system is very compact, is easy to manufacture and assemble, and can even be integrated into a laser module. In addition, with the first freeform surfaces of different designs, it is possible to match and correct deviations of the divergence angle caused by different light sources.

Simulation and Test Results

Now, firstly, the optical system illustrated in FIG. 2 is simulated and physically tested (i.e. measured) respectively, wherein the input light is from a fiber with Numerical Aperture (NA, dimensionless) of 0.06.

Figure 8B:
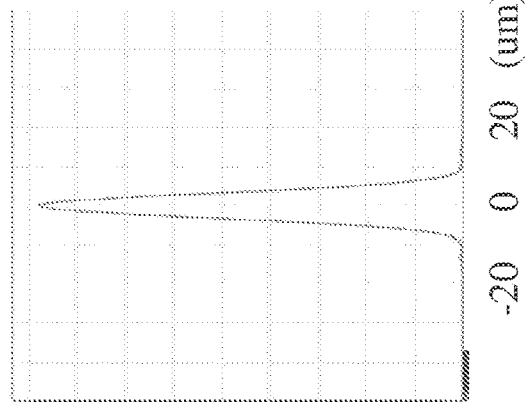
FIGS. 8A-8B show graphs of simulation results of light intensity distribution along the first axis (e.g. x-axis) and the second axis (e.g. y axis) according to the embodiment of FIG. 2 respectively.
Figure 8D:
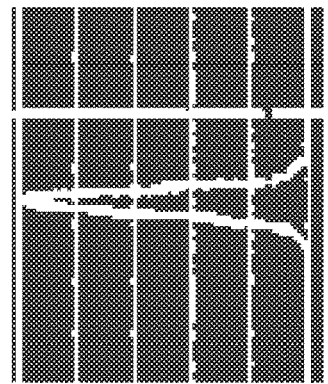
FIGS. 8C-8D show graphs of measurement results of light intensity distribution along the first axis (e.g. x-axis) and the second axis (e.g. y axis) according to the embodiment of FIG. 2 respectively.
Figure 8A:
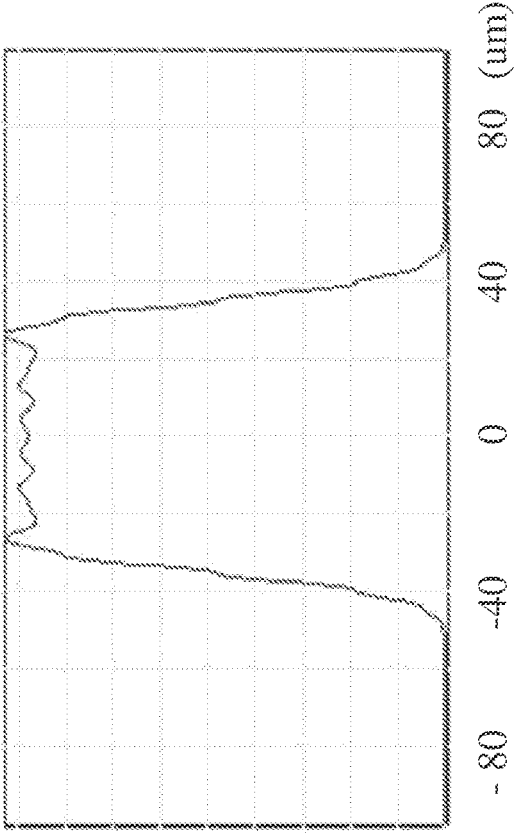
Figure 8C:
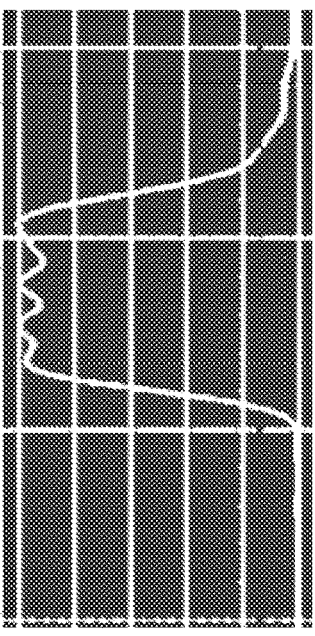

FIGS. 8A and 8B show graphs of simulation results of light intensity distribution of the embodiment shown in FIG. 2 along the first axis (e.g. x-axis) and the second axis (e.g.

y axis) according to one embodiment of the present disclosure respectively, while FIGS. 8C and 8D show graphs of measurement results of light intensity distribution along the first axis (e.g. x-axis) and the second axis (e.g. y axis) according to the embodiment shown in FIG. 2 of the present disclosure respectively. In a specific solution of FIGS. 8A-8D, the freeform surface of the optical shaping element is configured based on following formula:

$$z = \frac{cy^2}{1+\sqrt{1-(1+K)c^2y^2}} + a_1y^2 + a_2y^4 + a_3y^6 + a_4y^8 + a_5y^{10} + a_6y^{12} \quad \text{Equation 6}$$

wherein parameters in above formula are listed as follows:
R=1/c: 0~1 mm;
K: −2~0;
a1: −1~0;
a2: −1~0;
a3: −0.010~0;
a4: −1~0;
a5: 0~0.5;
a6: −0.5~0.

The focal length of the optical shaping element in form of an optical lens in this specific solution may be 60-100 mm (for example, 81.25 mm under wavelength of 546 nm).

Specifically, the simulated flat top width within 3% Coefficient of Variance (CV, a ratio of standard deviation to mean) is 62 um (see FIG. 8A) while the tested 49 um (see FIG. 8C). The simulated Gaussian width above 1/e intensity is 13 um (see FIG. 8B) while the tested 16 um (see FIG. 8D).

Figure 9A:
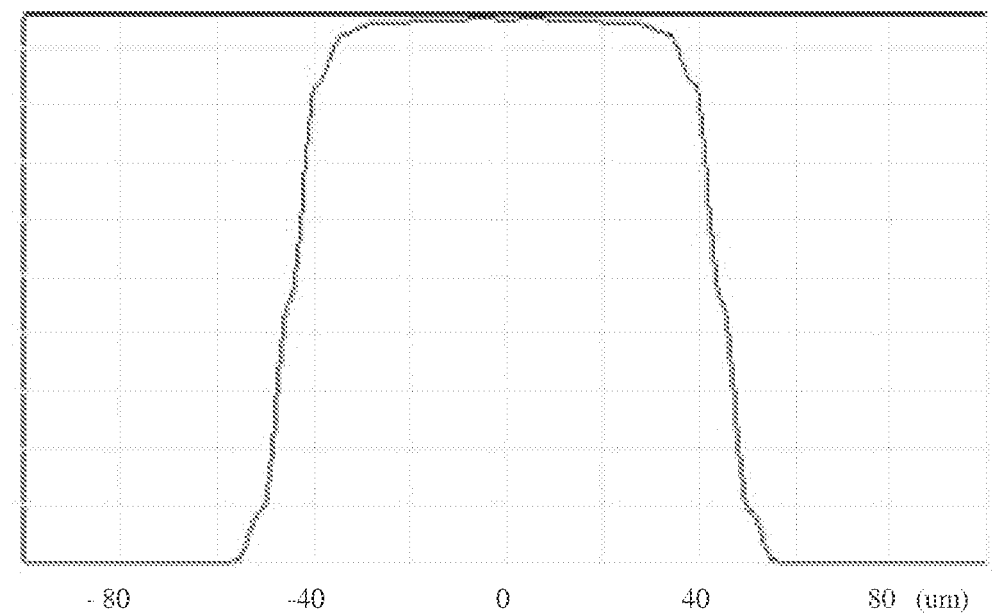
FIGS. 9A-9B show graphs of simulated light intensity distribution (i.e. flat-top profile) on the first axis (e.g. x-axis) of the shaping optic lens according to the embodiment of FIG. 2 respectively.
Figure 9B:
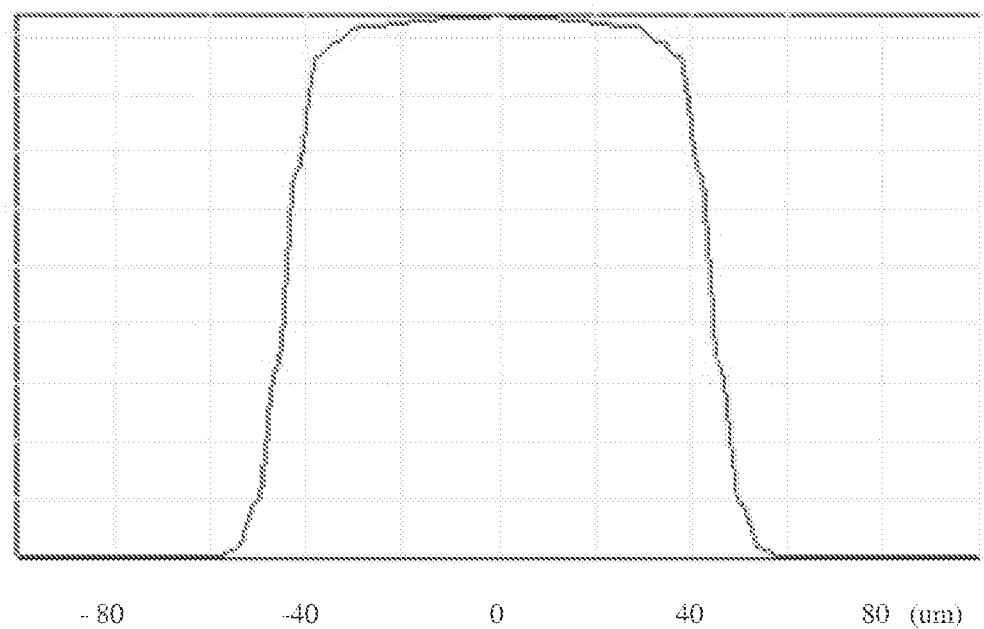

FIGS. 9A and 9B show graphs of simulated light intensity distribution (i.e. flat-top profile) on the first axis (e.g. x-axis) of the shaping optic lens according to the embodiment shown in FIG. 2 of the present disclosure for input light fibers with 0.06 NA (see FIG. 9A) and 0.08 NA (see FIG. 9B) respectively. In a specific solution of FIGS. 9A-9B, the freeform surface of the optical shaping element is configured based on following formula:

$$z = \frac{cy^2}{1+\sqrt{1-(1+K)c^2y^2}} + a_1y^2 + a_2y^4 + a_3y^6 + a_4y^8 + a_5y^{10} + a_6y^{12} \quad \text{Equation 7}$$

wherein parameters in above formula are listed as follows:
R=1/c: 20-25 mm;
K: −2000~−1000;
a1: −0.02~0.01;
a2: 0~0.001;
a3: 0~0.01;
a4: −0.01~0;
a5: 0~0.01;
a6: −0.01~0.

The focal length of the optical shaping element in form of an optical lens in this specific solution may be 70-120 mm (for example, 96.36 mm under wavelength of 546 nm).

This embodiment is optimized over the previous embodiment in such a way that the peak in the flat top profile will be smoother (with a smaller CV value) and the width of the flat top will be larger. Specifically, both simulated flat top width within 3% CV are 79 um, while the Gaussian width along the second axis (e.g. y axis) (which are not shown in figures) are 9 um and 10 um respectively.

Figure 10A:
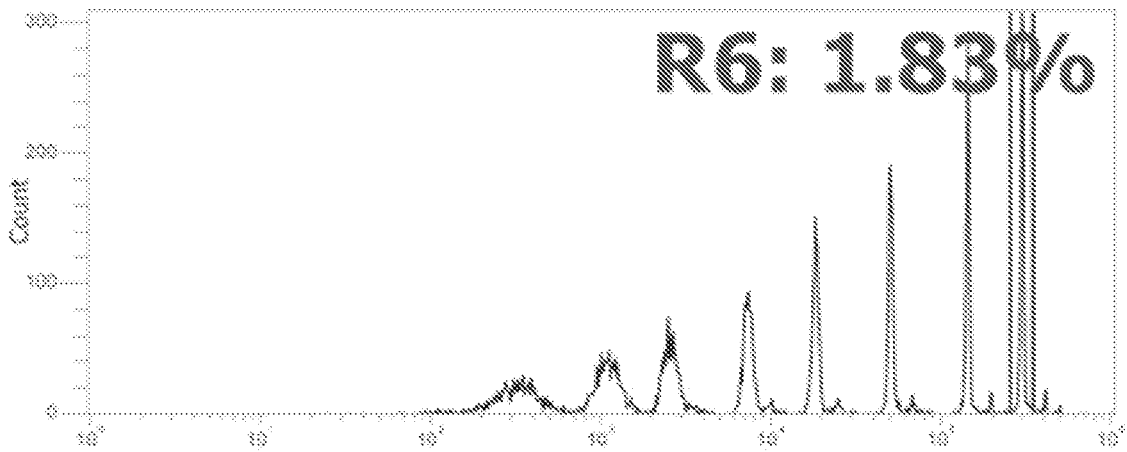
FIGS. 10A-10C show graphs of test results of one fluorescence channel with sample flow rates of 12.5 uL/min, 100 uL/min and 500 uL/min, respectively.
Figure 10B:
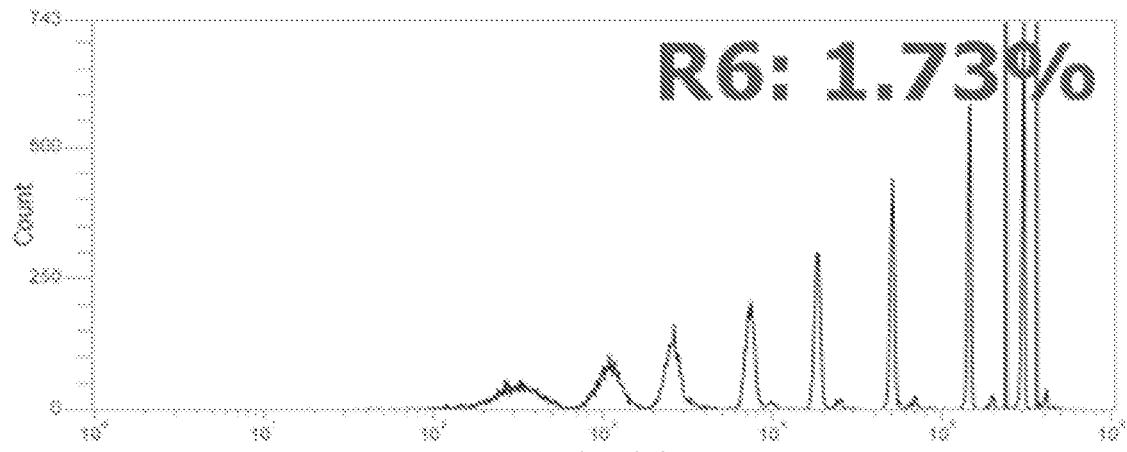
Figure 10C:
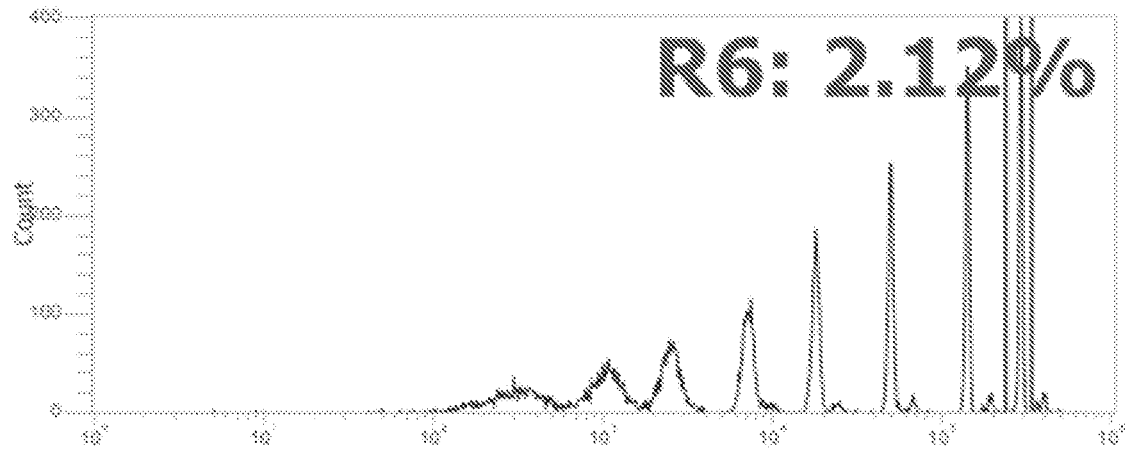

Finally, the optics system installed within a flow cytometer with acoustic and hydrodynamic focusing (Attune® NxT Flow Cytometer, Thermo Fisher Scientific Inc.) of the embodiment shown in FIG. 2 of present disclosure is also tested. The sample is Rainbow Calibration Particles, which has 8 types of particles. FIGS. 10A-10C show graphs of test results of one fluorescence channel with sample flow rates of 12.5 uL/min, 100 uL/min and 500 uL/min, respectively. The corresponding CV of the first peak (i.e. the rightmost peak among the eight peaks) are 1.83%, 1.73% and 2.12%, respectively (labeled in R6 in figures) (CV of smaller than 3% is required).

In various embodiments shown in FIGS. 11-14, the light source incorporated in the optical system 100 is preferably a light source that includes light beam(s) of a single wavelength.

In the case where the light beam emitted by the light source includes only a single wavelength, there's no need for the optical system 100 according to the present disclosure to provide an optical lens for compensating for negative chromatic aberration between the optical focusing element and the light source. Therefore, the optical system 100 can provide a dispersion-free collimated light beam before the optical shaping element 3 for shaping the beam, wherein the collimated light beam can be irradiated toward the optical shaping element along the main axis (also referred to as the optical axis) of the optical shaping element 3, mainly in form of parallel light beam irradiated toward the optical shaping element.

It will be appreciated that the optical collimating element 2 for providing a non-dispersive collimated light beam may comprise any optical element that can achieve this function, but generally should not include lenses which produce positive and negative dispersion. The diameter of the collimated light beam may be and may not be expanded. For example, the optical collimating element may be designed to adapt to divergence angles of less than 180 degrees and have no chromatic aberration (i.e., focus shift) for wide wavelengths having a bandwidth greater than 100 nm.

Since the light beam emitted by the light source comprises only a single wavelength, independently of the arrangement of the optical device, especially the optical focusing element disposed after the optical shaping element along the optical main axis, the resulting image will not have dispersion/chromatic aberration. In this case, since an optical collimating element for providing dispersion-free collimated light beam is employed, reusability of the optical device within the optical system 100 can be significantly improved.

In a preferred embodiment, the optical collimating element comprises a reflection mirror. For example, the optical collimating element may comprise a single reflection mirror or a group of reflection mirrors consisting of a plurality of reflection mirrors. In particular, the optical collimating element may comprise a reflection mirror group consisting of a plurality of reflection mirrors of different types. It will be appreciated that since the reflection mirror is different from the lens (i.e., no refraction but only reflection occurs), no dispersion of the collimated light beam is produced.

In a particularly preferred embodiment, the aforementioned reflection mirrors can be designed as a single parabolic reflection mirror. For example, the parabolic reflection mirror can provide off-axis light beam collimation, without causing focus shift in the case of large wavelength shifts (e.g. greater than 100 nm).

Alternatively, the reflection mirror can be designed as a spherical mirror, an aspheric mirror, a free-form mirror or a combination of different types of mirrors. Thereby, it is possible to provide a reflection mirror group in which the off-axis light beam collimation is provided without causing any focus shift in a wide wavelength range.

In the present disclosure, the surface of the reflection mirror can be described by a following function:

$$z = f(x) = a\left(x + \frac{b}{2a}\right) + \frac{4ac - b^2}{4a} + \delta(x) \quad \text{Equation 8}$$

wherein +bz+c=0, $\delta(x)$ is a correction function for the optical shaping element for collimation adjustment. When $\delta(x)=0$, the reflection mirror is a parabolic mirror with its focus at $$F = \left(\frac{-b}{2a}, \frac{4ac - b^2 + 1}{4a}\right),$$

and the directrix of parabolic curve is $$z = \frac{4ac - b^2 - 1}{4a}.$$

In addition to the optical collimating elements mentioned above, in a preferred embodiment, the collimated light beam can be shaped by means of the optical shaping element 3 such that the light intensity of the collimated light beam has a flat-top profile on a first axis which is perpendicular to the aforementioned main axis.

In one example, the optical shaping element 3 can be designed to be suitable for light beam having a beam diameter and a wavelength bandwidth of less than 20 nm. Also for example, the optical shaping element can be designed as diffractive optical element, lens array, a Powell lens, cylindrical lens pair or free-form lens which usually requires well-collimated light beam.

In the present disclosure, the term "flat-top profile" may mean that the intensity of the flat-top region of the light intensity has a relative variation range (i.e., a ratio of difference between the maximum light intensity and the minimum light intensity to the average light intensity in this region) of less than about 10%, while a ratio of the light intensity within the flat-top region to the total light intensity on the corresponding axis is greater than about 30%, but "flat-top profile" may not be limited to those patterns which meet these two conditions.

In this preferred embodiment, it is more advantageous when the optical collimating element 2 is configured as a parabolic mirror or other reflection mirror having a symmetry axis, the optical collimating element 2 is oriented such that the plane of symmetry of the parabolic reflection mirror or other reflection mirror is parallel to or contains the first axis.

It can be understood that if the first axis (i.e., the axis on which the flat-top profile of energy distribution of the resulting light beam exists) is set as the symmetry axis of the energy distribution of the output light beam of the reflection mirror, influence of the asymmetric energy distribution of the output light beam on the uniformity of the light intensity in the flat-top profile of the light beam can be avoided.

In addition, in above mentioned embodiments, the optical system 100 may further include an optical focusing element 4 facing the optical shaping element 3 to converge/focus the light beam shaped by the optical shaping element 3 onto a designated area. For example, the optical focusing element 4 can focus the shaped light beam to a spot sized in magnitude of micronmeter at a certain distance from it (i.e., at a designated area).

The magnifications of the optical focusing element 4 may be identical or different on two different axes perpendicular to each other (the two axes are also perpendicular to the main axis). The optical focusing element may be, for example, doublet lens (convex and concave lens in pair), aspherical lens or lens group or the like.

In a particularly advantageous embodiment, the optical collimating element 2, the optical shaping element 3 and the optical focusing element 4 are integrated together at fixed spacings relative to each other (i.e., assembled together at fixed spacings). In an integrated optical device, incident light beam may enter the optical collimating element and then exit the integrated optical device from the back surface of the focusing optical system 100.

The optical elements of the optical system 100 of the present disclosure are further exemplified in the following with reference to FIGS. 11-14.

Figure 11:
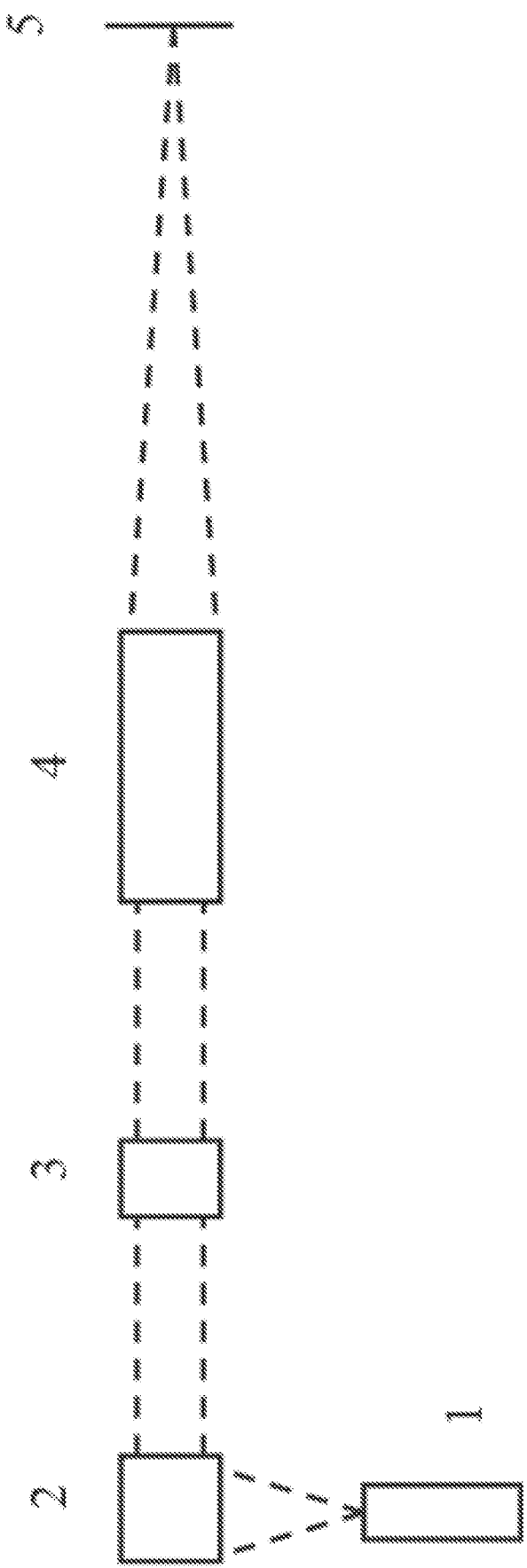
FIG. 11 schematically shows a first embodiment of an optical system of the present disclosure including an optical collimating element, wherein the optical collimating element may provide dispersion-free collimated light beams.

FIG. 11 shows a schematic diagram of a first embodiment of an optical system 100 in accordance with the present disclosure, wherein the optical system 100 comprises a light source 1 that provides single wavelength light beam, an optical collimating element 2 providing a dispersion-free collimated light beam, an optical shaping element 3 for shaping the light beams and an optical focusing element 4 for converging/focusing the light beam onto a designated area 5.

Figure 12:
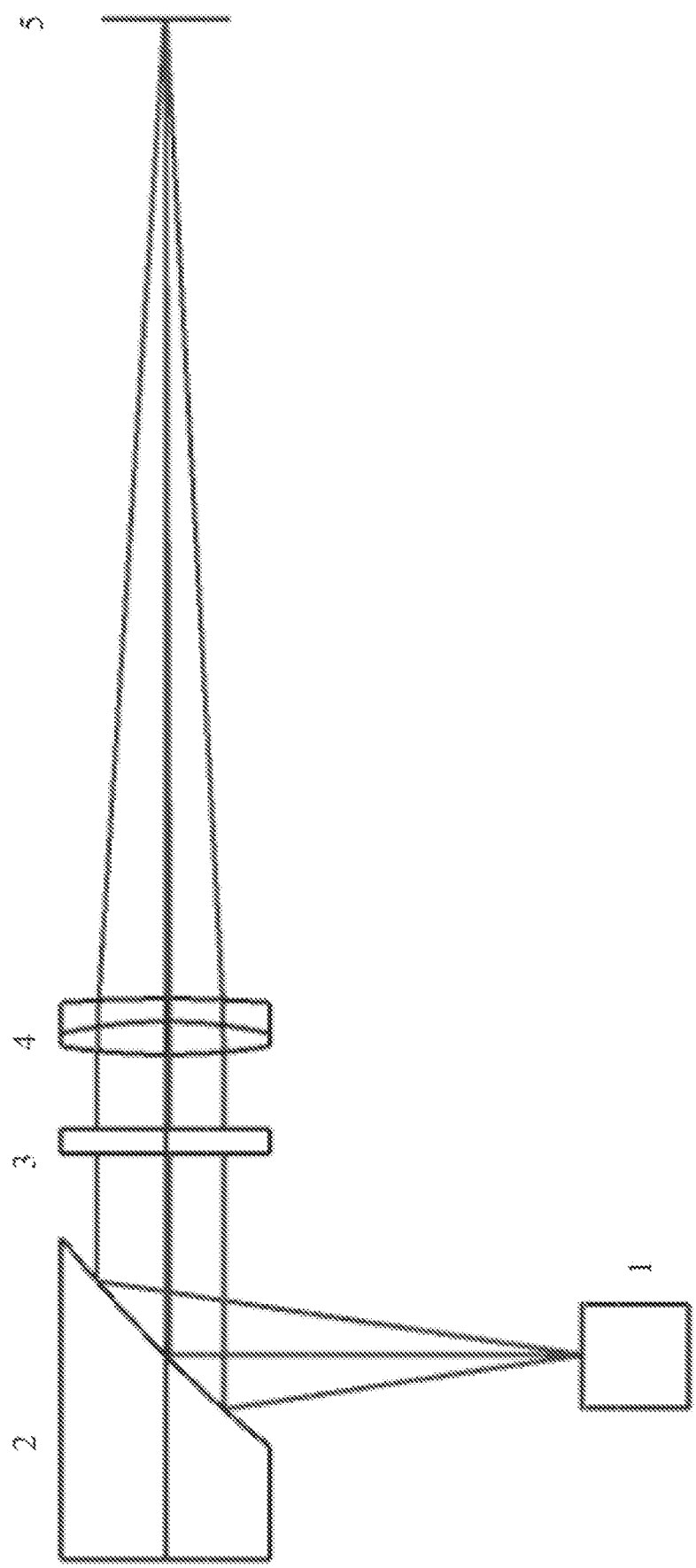
FIG. 12 schematically shows a second embodiment of an optical system of the present disclosure including an optical collimating element, wherein the optical collimating element is configured as a parabolic mirror with a reflection angle of about 90 degrees.

In another embodiment shown in FIG. 12, the optical collimating element 2 can be implemented as a single parabolic mirror. With the parabolic mirror, the light beam from the light source 1 is reflected by about 90 degrees and irradiates toward the optical shaping element 3 in a direction parallel to the main axis (i.e., the optical axis). Meanwhile, the light beam is collimated via the optical collimating element and expanded to a desired beam size. In this embodiment, the optical shaping element 3 is designed as a diffractive optical element and the optical focusing element 4 is designed as doublet lens that focuses the light beam onto the imaging plane 5.

Figure 13:
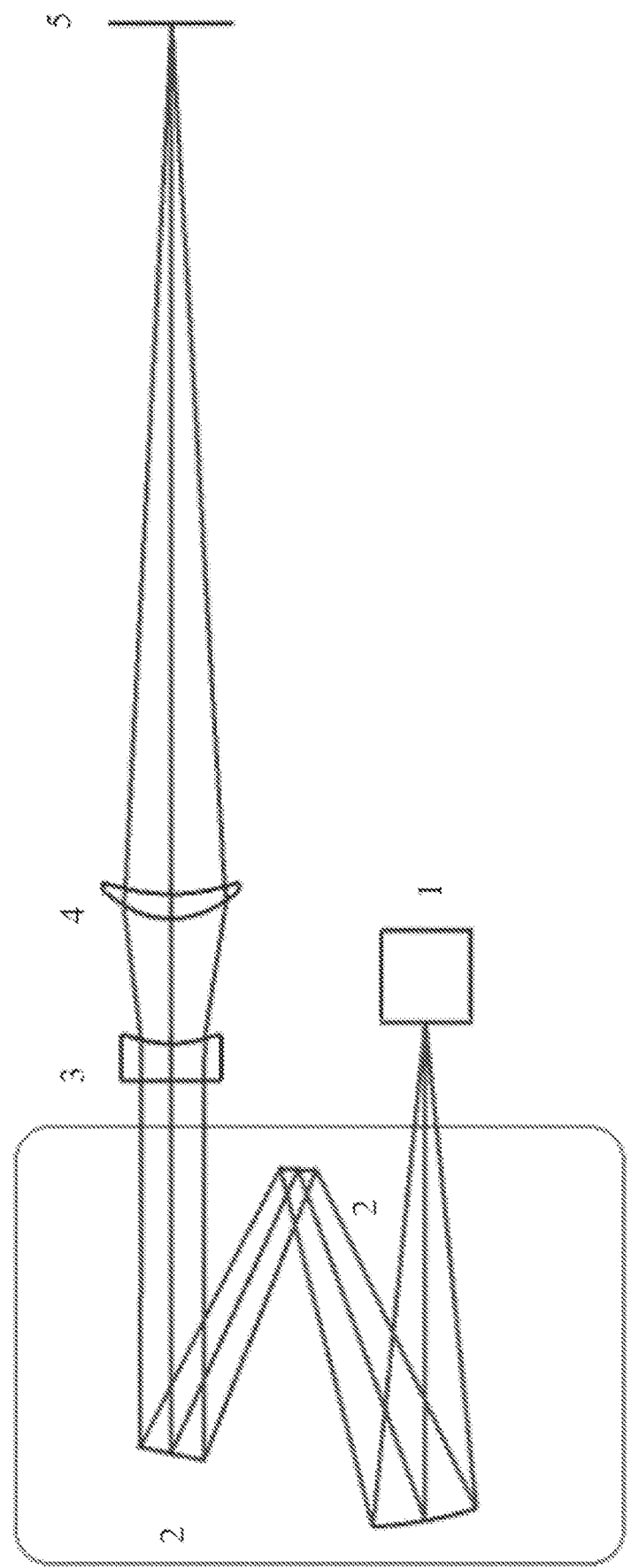
FIG. 13 schematically shows a third embodiment of an optical system of the present disclosure including an optical collimating element, wherein the optical collimating element is configured as three reflection mirrors with a reflection angle of about 180 degrees.

In a further embodiment shown in FIG. 13, the optical collimating element 2 may be implemented as a reflection mirror group consisting of three (off-axis) reflection mirrors. With this group of reflection mirrors, the light beam from the light source is reflected by about 180 degrees and irradiates towards the optical shaping element 3 in a direction parallel to the main axis (i.e., the optical axis). Meanwhile, the beam is collimated via the optical collimating element and expanded to a desired beam size. In this embodiment, the optical shaping element 3 is designed as a cylindrical lens and the optical focusing element 4 is designed as an aspherical mirror that focuses the light beam onto the imaging plane 5.

Figure 14:
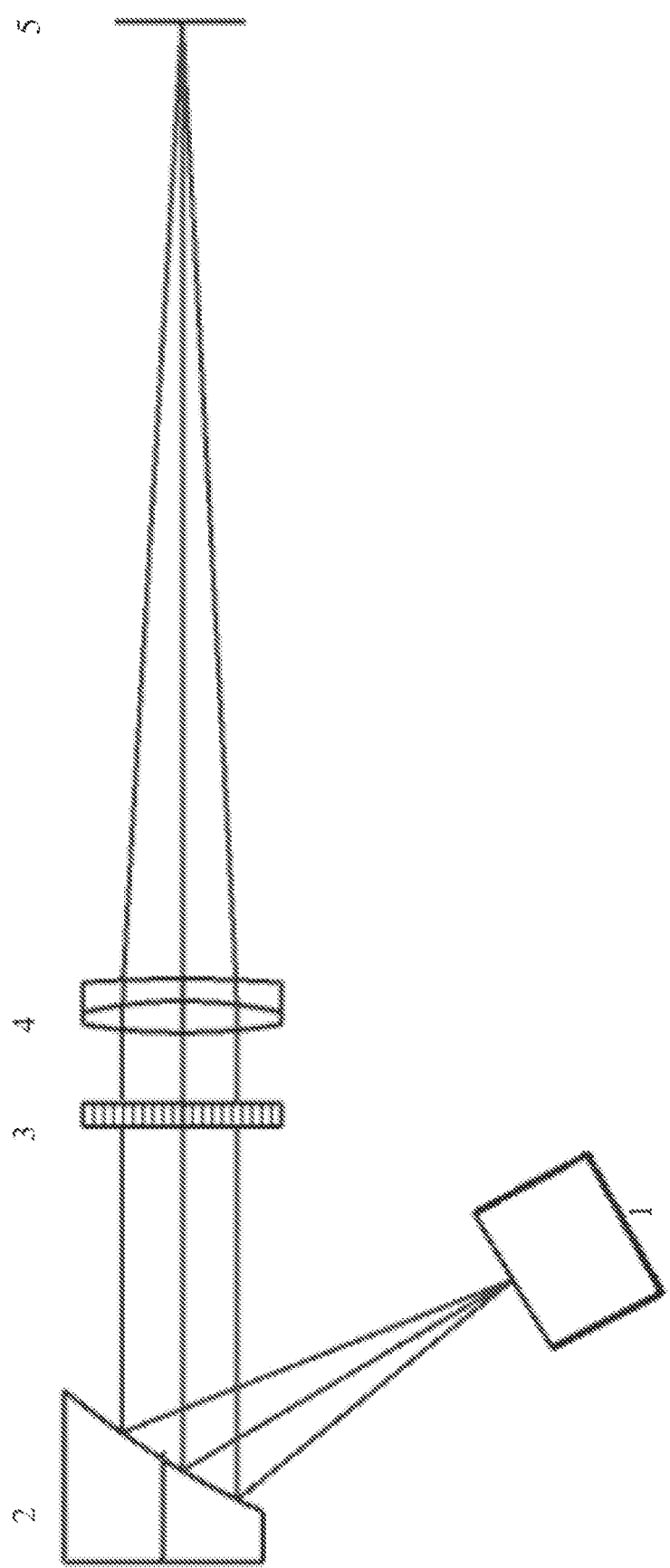
FIG. 14 schematically shows a fourth embodiment of an optical system of the present disclosure including an optical collimating element, wherein the optical collimating element is configured as a parabolic mirror with a reflection angle of about 45 degrees.
Figure 15:
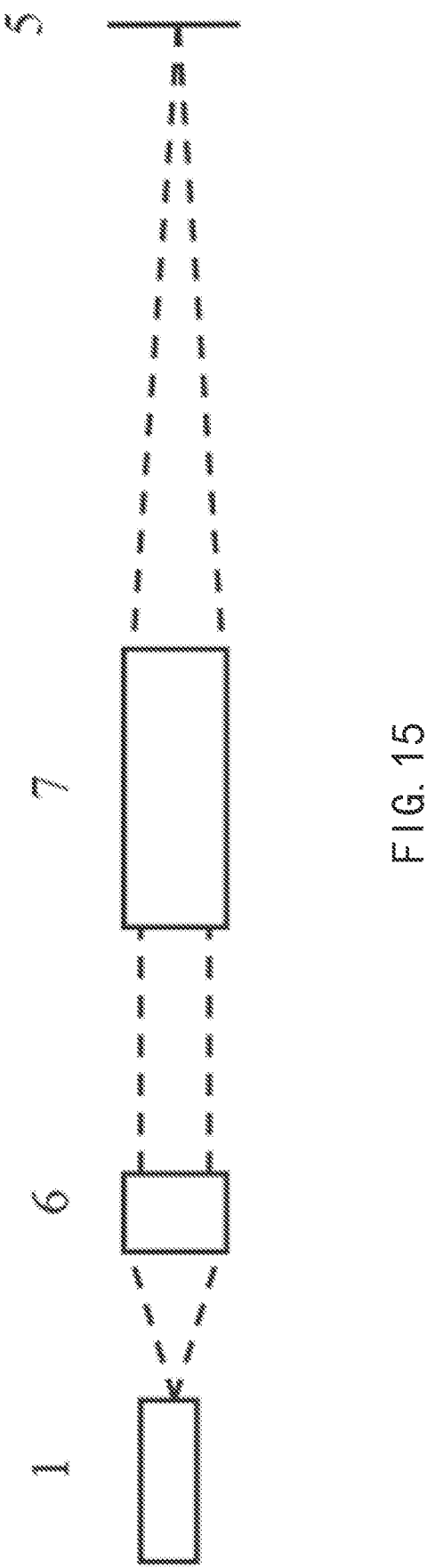
FIG. 15 schematically shows another embodiment of an optical system of the present disclosure including an optical shaping element and an optical focusing element.

In yet another embodiment shown in FIG. 14, the optical collimating element 2 may be designed an off-axis parabolic mirror 3. With the parabolic mirror, the light beam from the light source 1 is reflected by about 45 degrees and irradiates toward the optical shaping element 3 in the direction parallel to the main axis (i.e., the optical axis). Meanwhile, the beam is collimated via the optical collimating element and expanded to a desired beam size. In this embodiment, the optical shaping element 3 is designed as a diffractive optical element that may shape intensity of the light beam into a flat-top profile, while the optical focusing element 4 is designed as doublet lens (convex and concave lens in pair) that focuses the light beam onto the imaging plane 5.

It will be appreciated that although some reflection angles are mentioned in the various embodiments described above, the optical collimating element may be oriented in optical system 100 such that the light beam from the light source is reflected at a reflection angle from 0 to 180 degrees (e.g., 30 degrees, 60 degrees, etc.) onto the optical shaping element.

Thus, in a second aspect, the present disclosure provides an optical system, comprising: a light source for emitting a light beam having a single wavelength; an optical main axis; an optical shaping element for shaping the light beam facing the light source; and an optical collimating element arranged between the light source and the optical shaping element, wherein the optical collimating element is configured to provide dispersion-free collimated light beam that irradiates toward the optical shaping element along the main axis.

By means of this optical system, since a collimating optical element having no chromatic aberration (for example, an off-axis parabolic mirror) is used, the optical collimating element does not need to be replaced when the wavelength of the light beam is changed, thereby improving the reusability of the optical collimating element.

In a preferred embodiment, the optical collimating element comprises a reflection mirror. Since the reflection mirror only reflects light, it does not lead to any dispersion of the collimated light beam, thereby achieving collimation of the beam with lower cost and simpler structure.

Advantageously, the reflection mirror is designed as one single parabolic reflection mirror. The parabolic mirror may or may not be offset from the main axis. The parabolic mirror is low in manufacturing cost and simple in structure, and can provide off-axis light beam collimation without causing focus shift in the case of large wavelength shifts (i.e. greater than 100 nm).

Alternatively, the reflection mirror can also be designed as a spherical mirror or an aspherical mirror.

Furthermore, the optical collimating element can also be designed as a reflection mirror group consisting of a plurality of mirrors of different types, which can achieve a flexible arrangement of optical collimating elements in an optical system. Thus, the optical collimating element in the optical system can be oriented such that the light beam from a light source is reflected onto the optical shaping element at a reflection angle of any angle between 0 and 180 degrees (including 0 and 180 degrees). Since the collimating optical element without chromatic aberration (for example, an off-axis parabolic mirror group) is used, the angle between the incident light and the outgoing light can be 180 degrees. Thereby, the light source and the optical collimating element may be disposed side by side (e.g., as a group of optical components) or in other suitable manner, and thus the length of the overall system is reduced.

Preferably, the collimated light beam can be shaped by means of the optical shaping element such that the light intensity of the collimated light beam on the first axis perpendicular to the main axis has a flat-top profile, thereby providing uniform illumination to the cells in the flow cytometer in the cross section of the flow channel. The uniform distribution of light intensity may allow the cells to deviate from the central axis of the flow path or off the main axis of the light beam when flowing in the flow channel without causing signal degradation.

In addition, the optical system may also include an optical focusing element facing the optical shaping element to focus the light beam shaped by the optical shaping element onto a designated area, such as the flow path center of the flow cell. Thereby, it is possible to focus the shaped light beam which is still larger in size onto a desired smaller area (for example, the cross-sectional area at the designated position on the main axis of the beam is in order of 0.1 mm×0.01 mm), thus increasing the light intensity per unit volume of the laser beam in the flow channel and further increasing the sensitivity of cell detection.

Advantageously, the optical collimating element, the optical shaping element and the optical focusing element can be integrated together at fixed spacings relative to each other. This modular construction facilitates assembly, is easy to manufacture, and reduces costs.

More preferably, by means of the optical shaping element, the collimated light beam may be shaped such that the light intensity of the collimated light beam has a flat-top profile on the first axis perpendicular to the main axis, and the optical collimating element is oriented such that the symmetry plane of the parabolic reflection mirror is parallel to or contains the first axis. Thereby, influence of the asymmetric energy distribution of the output beam on the uniformity of the light intensity of the flat-top profile of the light beam on the first axis can be avoided.

In various embodiments shown in FIGS. 15-20, an optical collimating element may be provided before the optical shaping element. This optical collimating elements for collimating beam may include any optics that achieve this function, such as lenses with positive or negative chromatic aberration or various types of reflection mirrors (e.g., spherical mirrors, aspherical mirrors, freeform mirrors, or combinations of different types of mirrors). The diameter of the collimated beam may be expanded, but may not be expanded. In the present disclosure, the optical collimating element may provide a beam having no chromatic focal shift, but may also provide a beam having chromatic focal shift. In the present disclosure, the light beam (whether it is collimated via an optical collimating element or not) can be shaped by means of the optical shaping element 6 such that the intensity of the light on both the first axis and the second axis has a flat-top profile. Here, the first axis and the second axis are oriented perpendicular to the optical main axis, respectively, and the first axis and the second axis are also perpendicular to each other. In other words, the first axis, the second axis, and the optical master axis are perpendicular to each other (e.g., they may be x-axis, y-axis, and z-axis in a Cartesian coordinate system). Furthermore, it should be noted that the terms "first" and "second" are not distinguished by importance or order, but merely to illustrate that the two axes are different and independent from each other.

For example, the optical shaping element 6 can be implemented as diffractive optical element, lens array, Powell lens, cylindrical lens (pair) or free-form lens, which may require a well collimated beam of light. Some optical shaping elements 6 which are in the prior art are readily available and less expensive.

In one example, the Powell lens can make the beam having flat-top profiles of the desired light intensity on the first axis and the second axis, respectively. In another example, the optical shaping element 6 can be constructed as a hollow fiber into which the light beam from the light source 1 can be coupled such that the light intensity of the beam becomes a flat-top profile.

In many approaches known in the art, merely one single optical shaping element is used to shape the light beam in such a way that its light intensity has flat-top profile on the first axis and a Gaussian profile (i.e., normal distribution) on the second axis. In contrast thereto, the optical shaping element 6 of the optical system 100 according to the disclosure is constructed only as a common lens, such as a Powell lens, without complex calculations of the surface of the optical shaping element 6.

Furthermore, in order to achieve a flat-top profile of light intensity on the first axis and a Gaussian profile on the second axis, the optical system 100 according to the present disclosure further includes an optical focusing element 7 after the optical shaping element 6 along the optical main axis (i.e. the optical shaping element 6 is located between the optical focusing element 7 and the light source with or without the optical collimating element optionally in-between the optical focusing element and light source). The optical focusing element 7 is used to converge a beam that has been shaped by the optical shaping element 6 (or may also be referred to as "initially shaped beam" in the present disclosure) to a designated area. The designated area is spaced apart from the optical focusing element 7 by a fixed distance, and an imaging plane is provided at the designated area.

The magnifications of the optical focusing element 7 according to the disclosure can be designed differently on different axes, and the initially shaped flat-top profiles can be shaped or focused by the optical focusing element 7 in such a way that flat-top profile remains on one axis while the flat-top profile changes into a Gaussian profile on the other axis. In other words, the different light intensity distribution patterns on the first axis and the second axis can be achieved in certain embodiments through stages by a combination of at least the optical focusing element 7 and the optical shaping element 6.

Particularly preferably, magnifications of the optical focusing element 7 on the first axis and the second axis are designed in such a way that the optical focusing element 7 has a first diffraction limit dimension on the first axis while it has a second diffraction limit dimension on the second axis. At the designated area where the imaging plane is located, there's a first difference between a first spot size of the light beam on the first axis and the first diffraction limit dimension which difference keeps light intensity of the light beam on the first axis as a flat-top profile (i.e. flat-top profile remains), and there's a second difference between a second spot size of the light beam on the second axis and the second diffraction limit dimension which difference changes light intensity of the light beam on the second axis as a Gaussian profile, and wherein the first difference is larger than the second difference.

The term "diffraction limit" refers that, when an ideal point is imaged by an optical lens, due to the limitation of the physical diffraction phenomenon, it is impossible to obtain an ideal image point at the focus of the lens, but to obtain a Fraunhofer diffraction image. The size of this diffraction image is called the diffraction limit dimension/size. Since the magnifications of the optical focusing element 7 according to the disclosure can be designed differently on two different axes, a first diffraction limit (with a first dimension) and a second diffraction limit (with a second dimension) can be obtained on the first axis and the second axis, respectively. It should be noted that the term "different" in this context primarily emphasizes the (design) independence of the two involved, without necessarily requiring that their values be unequal.

Assuming that the focused spot is a circular spot, the approximate formula for the diffraction limit dimension is as follows:

$$\omega_0 = \frac{\lambda}{n \cdot NA},$$

wherein $2\omega_0$ refers to intensity distribution width with a threshold of 1/e intensity (um as unit but not limited to um), $\lambda$ refers to wave length of a monochromatic light beam, NA refers to numerical aperture of an optical focusing element (for example, a focusing lens)

$$NA = \frac{D}{2f},$$

D refers to light passing diameter of the focusing lens and f refers to image focal length of the focusing lens. Since the focal lengths of the optical focusing element along the optical main axis are different on the first axis and on the second axis (i.e., there is a first focal length and a second focal length), there are two different numerical apertures.

In short, in geometrical optics, with an optical focusing lens, the focus is infinitely small. However, due to the diffraction effect of light, in physical optics, the spot size of the focus will be equal to the diffraction limit dimension/size, and the spot size (diameter) should be $2\omega_0$.

Further, it will be appreciated that at the focus (the optical focusing element 7 according to the present disclosure includes a first focus on the first axis and a second focus on the second axis), although due to the presence of diffraction limits light beam will not actually be focused as one spot in theory, but energy of the light beam is highly concentrated here. There may be a light intensity of no less than 1/e within the aforementioned spot size range (i.e., a light intensity distribution width with a threshold of 1/e). In any case, the light intensity distribution of the beam at the focus must have a Gaussian profile for its energy distribution, rather than a flat-top distribution.

As the imaging plane approaches from the (first/second) focus toward the optical focusing element 7, the spot size appearing on the imaging plane increases continuously, and the concentration of beam intensity decreases gradually. Here, there is a difference (i.e., the first difference on the first axis and the second on the second axis) between the (first/second) spot size and the (first/second) diffraction limit dimension. Such differences are generally greater than or equal to zero. Since the first difference is greater than the second difference, the first difference is necessarily greater than zero.

In the present disclosure, in order to have a flat-top profile of the light intensity on the first axis and a Gaussian profile on the second axis, it is necessary to make the second difference mentioned above as small as possible, for example close to zero (but need not necessarily be zero)). This is because when the second difference is zero, the Gaussian profile of the light intensity is necessarily obtained, and as the second difference gradually increases from zero, the variation in distribution intensity of the Gaussian profile becomes smaller until under a certain difference, there's no Gaussian profile any longer, but a flat-top profile. The value of the first difference per se may be large, and the variable range of the value of the first difference may also be large.

In fact, the larger the spot size is (i.e., the larger the distance between the focus and the imaging plane), the lower the percentage of light intensity over a particular diameter (e.g., within the range of diffraction limit dimensions). Therefore, in addition to the above definitions of (first/second) differences between the (first/second) spot size and the (first/second) diffraction limit dimension, it is also considered that the percentage of light intensity contained in a particular size (diameter) in the spot is used to characterize the distribution/profile of light intensity, i.e. a Gaussian profile or a flat-top profile.

For example, the magnifications of the optical focusing element 7 on the aforementioned first axis and on the second axis can be designed, respectively, such that on the imaging plane at the designated area, the second spot on the second axis within the second diffraction limit dimension has a light intensity that is greater than or equal to a predetermined value, such as 10%, 30%, or the like, to vary from a flat-top profile to a Gaussian profile, and the first spot on the first axis within the first diffraction limit dimension range has a light intensity that is less than a predetermined value, such as 10%.

In addition, it should also be understood that when designing the optical focusing element 7, it may be desirable that the second spot (i.e., on the second axis) on the imaging plane at the designated area has a size that is less than or equal to the second diffraction limit dimension. This is because design is performed based on geometric optics and the second spot size is the target spot size. In the actual simulation or experiment, since the diffraction limit is physically present, the second spot size thus designed can be made very close to the second diffraction limit dimension (but not smaller than the second diffraction limit dimension) because physical optics rules simulation or experimentation. As previously mentioned, the so-called second spot size being "very close" to the second diffraction limit dimension is not necessary and is only preferred.

In one example, the magnifications of the optical focusing element 7 in the direction of the first axis and the second axis are respectively designed such that, at the designated area, the first spot size is greater than or equal to twice the size of the first diffraction limit dimension, and the second spot size is less than twice the size of the second diffraction limit dimension.

In a preferred embodiment, the optical focusing element according to the present disclosure may be cylindrical lens, freeform lens, tire lens, or a combination thereof. Furthermore, the optical focusing element may be designed as a lens group consisting of a plurality of lenses of different types.

On the imaging plane at the designated area, the beam may be focused by the optical focusing element into a spot size with magnitude of micrometer, but it can also be other spot sizes that meet actual needs.

After the design is completed, it is preferred that the optical shaping element 6 and the optical focusing element 7 are integrated at a fixed distance from each other. This modular construction facilitates assembly, is easy to manufacture, and reduces costs.

The optical components of the optical system 100 of the present disclosure are further exemplarily explained below with reference to FIGS. 16-20.

Figure 16:
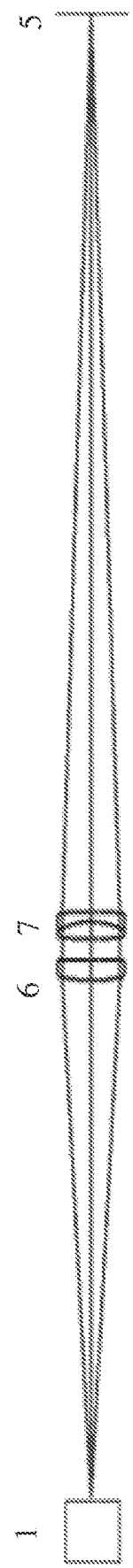
FIG. 16 schematically shows yet another embodiment of an optical system of the present disclosure wherein the optical shaping element is configured as toroidal lens and the optical focusing element is configured as doublet lens.

FIG. 16 shows a schematic diagram of yet another embodiment of an optical system 100 in accordance with the present disclosure, wherein the optical system 100 includes an optical shaping element 6 for shaping a beam of light and an optical focusing element 7 that focuses the beam of light onto a designated area 5. Here, the optical shaping element 6 employs a toroidal lens (i.e., a tire lens), and the optical focusing element 7 employs doublet lens.

Figure 17A:
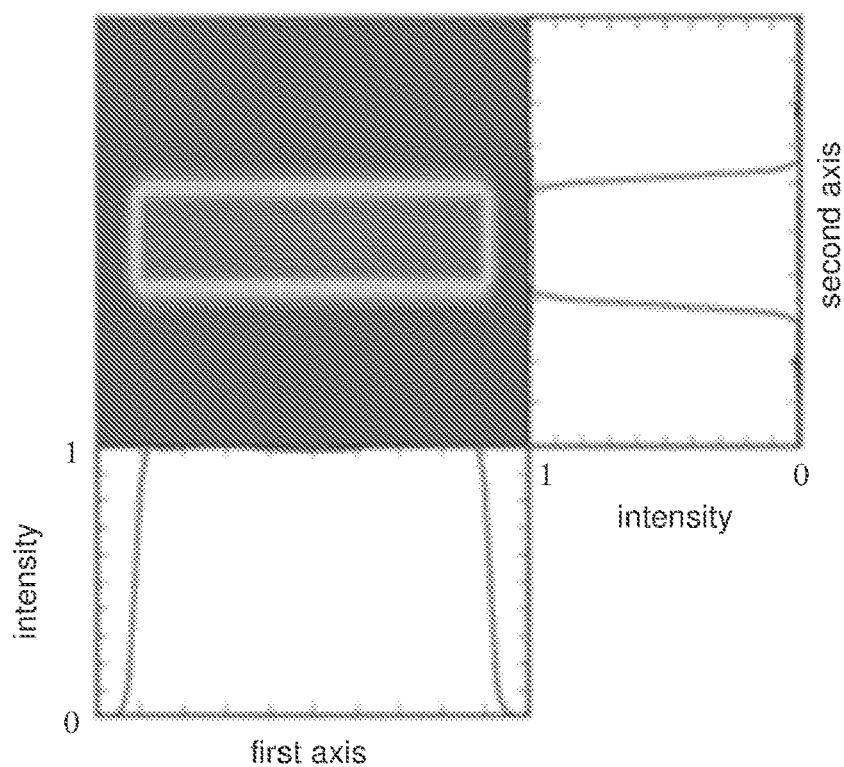
FIGS. 17A-17B show graphs of profiles of light intensity distribution along the first axis and the second axis according to yet another embodiment of FIG. 16 respectively.
Figure 17B:
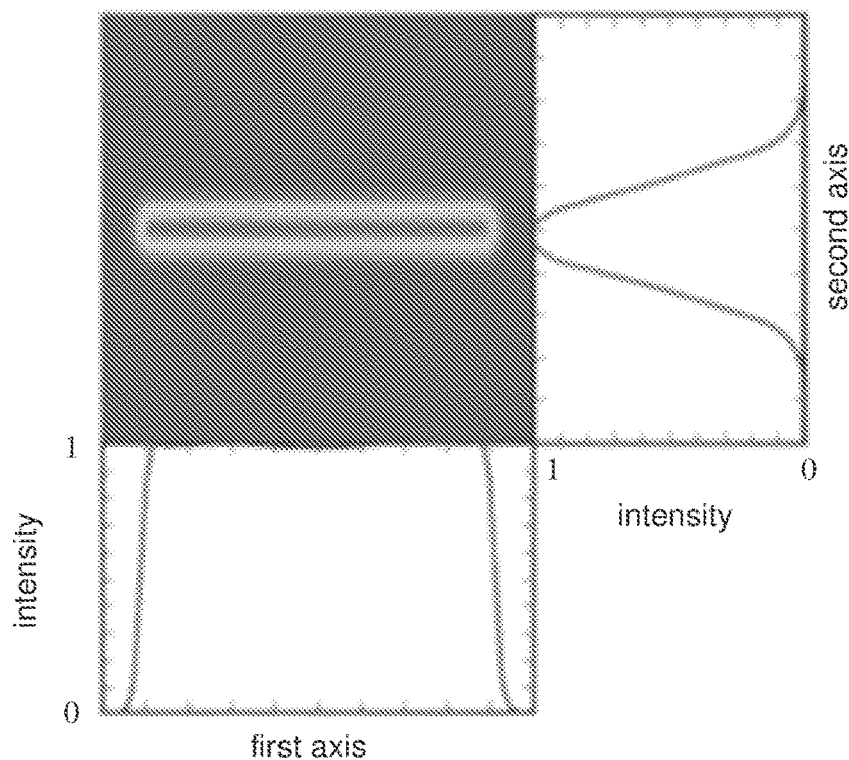

FIGS. 17A-17B show the light intensity distributions on the first axis and the second axis simulated with the exemplary optical system 100 shown in FIG. 16, in particular with its optical shaping element 6 and optical focusing element 7. FIG. 17A shows the light intensity distribution after the optical shaping element 6 and right before the optical focusing element 7, which are both flat-top profiles with the only difference in the widths of the flat-top profiles after the toroidal lens (i.e., the tire lens). FIG. 17B shows light intensity distributions on the imaging plane at the designated area after being focused by the optical focusing element 7, wherein the first axis remains a flat-top profile, and the second axis is changed into a Gaussian profile.

Figure 18:
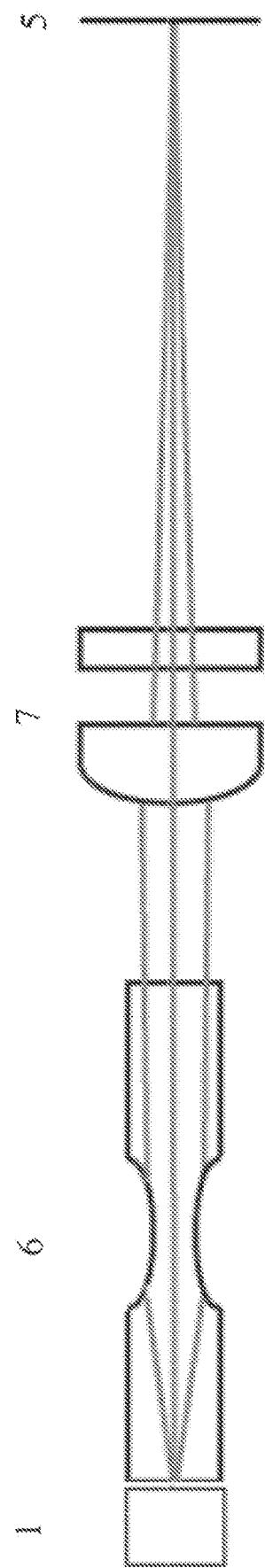
FIG. 18 schematically shows still yet another embodiment of an optical system of the present disclosure wherein the optical shaping element is configured as hollow fiber and the optical focusing element is configured as acylindrical lens groups symmetry axes of which are perpendicular to each other.

FIG. 18 shows a schematic diagram of still yet another embodiment of an optical system 100 in accordance with the present disclosure, wherein the optical system 100 includes an optical shaping element 6 for shaping a beam of light and an optical focusing element 7 for focusing the light beam onto a designated area 5. Here, the optical shaping element 6 employs hollow fibers, and the optical focusing element 7 employs acylindrical lens group in which the symmetry axes are perpendicular to each other.

Figure 19A:
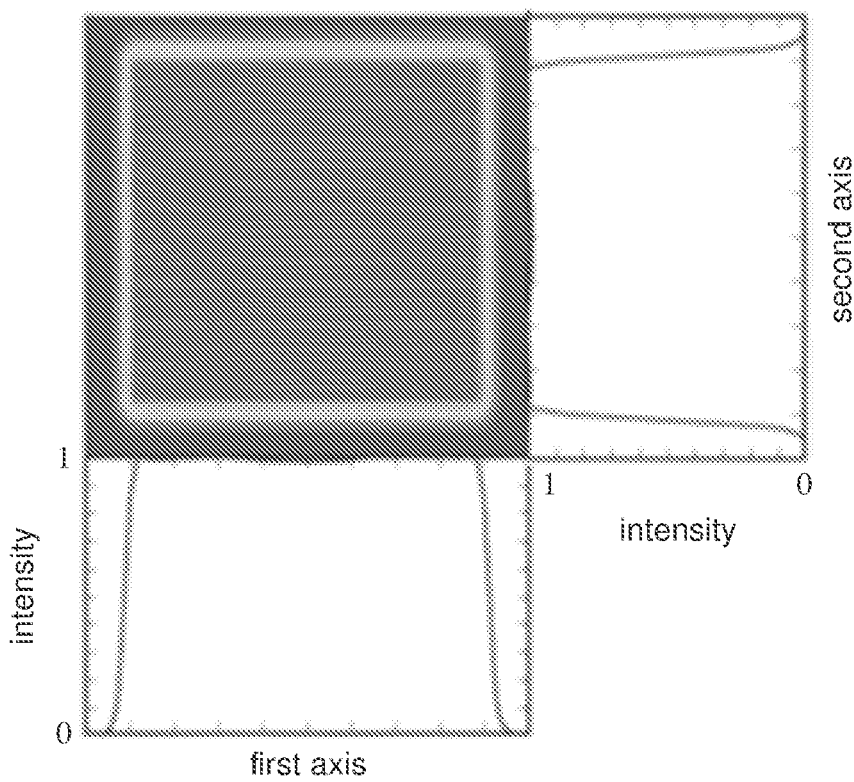
Figure 19B:
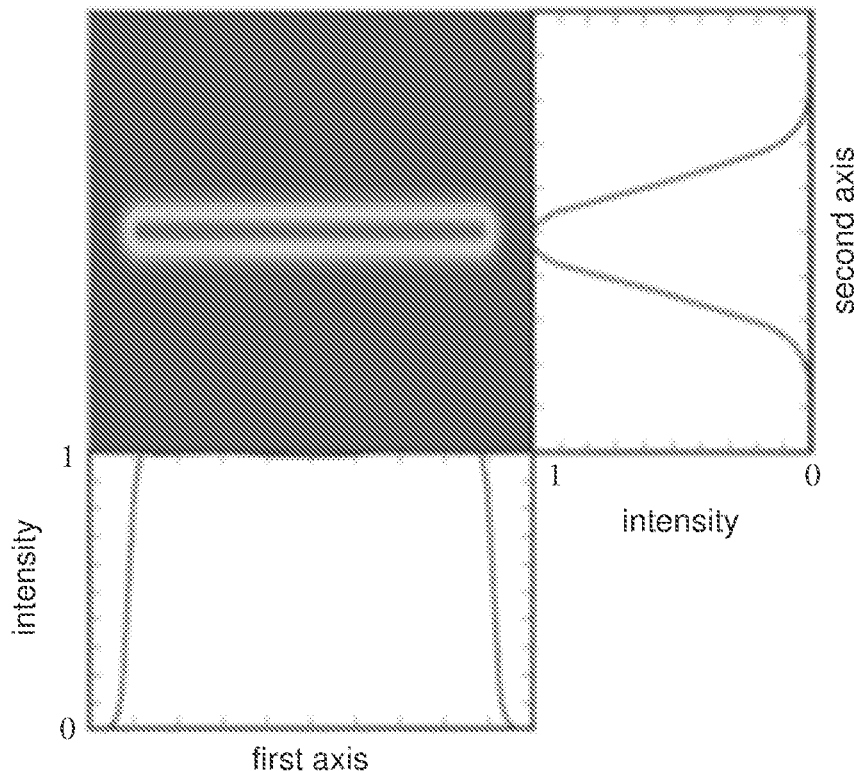

FIGS. 19A-19B show the light intensity distribution on the first axis and on the second axis simulated with the exemplary optical system 100 shown in FIG. 18, in particular with its optical shaping element 6 and optical focusing element 7. FIG. 19A shows the light intensity distribution after the optical shaping element 6 and right before the optical focusing element 7, both of which are flat-top distributions with no significant difference in widths of the flat-top profile, and FIG. 19B shows curves of the intensity distribution after the optical focusing element 7 and on the imaging plane at the designated area, wherein the flat-top profile remains on the first axis while it is changed into a Gaussian profile on the second axis.

Figure 20:
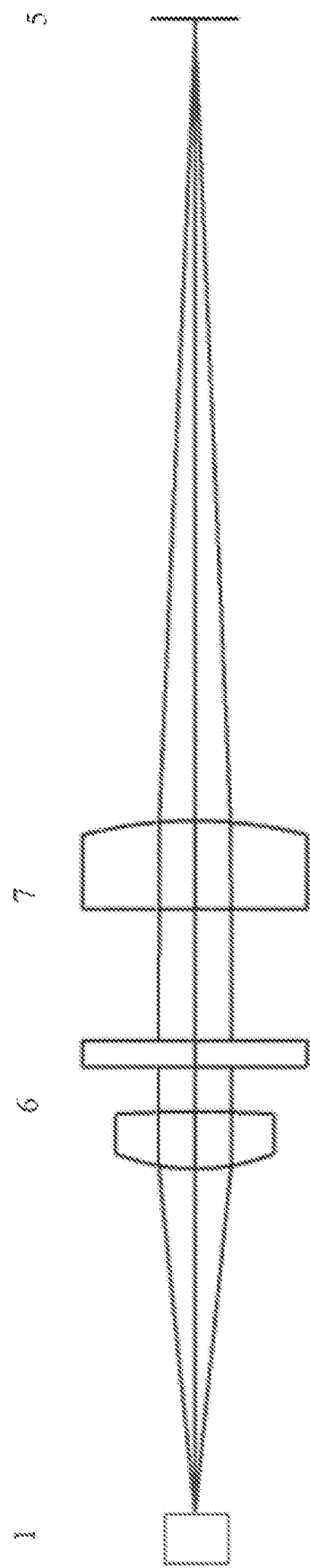
FIG. 20 schematically shows still another embodiment of an optical system of the present disclosure wherein the optical shaping element is configured as a diffractive optical element and the optical focusing element is configured as acylindrical lens.

Finally, FIG. 20 shows a schematic diagram of still another embodiment of an optical system 100 in accordance with the present disclosure in which the optical shaping element 6 employs diffractive optical element and the optical focusing element 7 employs acylindrical lens.

In one example (for example, referring to FIG. 18), the wavelength of the light source 1 may be, for example, 400 nm, and the focusing lens group is composed of two acylindrical lenses. The image side numerical aperture NA of the second acylindrical lens in the plane of the main axis and the second axis is 0.1, and the corresponding diffraction limit dimension is about 3.2 um. The image side numerical aperture NA of the first acylindrical lens in the plane of the main axis and the first axis is 0.2, and the corresponding diffraction limit dimension is about 1.6 um. The ratio of the magnifications of the focusing lens group on the first axis and the second axis is, therefore, 2:1.

By designing the lens parameters, the distance to the fiber, and the distance to the designated region, the intensity distribution width (i.e., the second spot size) at the threshold of 1/e on the second axis at the designated region can be made close to the corresponding diffraction limit of about 3.2 um. The intensity distribution width (i.e., the first spot size) at the threshold of 1/e on the first axis at the designated area is 10 um, which is much larger than the corresponding numerical diffraction limit of 1.6 um. Thereby, the light intensity distribution of the light beam on the second axis at the designated area changes to a Gaussian profile, and the light intensity of the light beam on the first axis remains a flat-top profile.

Furthermore, when the optical focusing element 7 is configured as an axis-symmetric lens (spherical lens, aspherical lens or a combination thereof), the optical shaping element 6 is preferably designed to shape the beam in such a way, before the beam enters the optical focusing element 7 (the difference in locations between the optical shaping element 6 and the optical focusing element 7 is ignored here), the intensity distributions of the light beam on the first axis and the second axis are flat-top profiles of different widths, wherein ratio of the flat-top widths of the first axis and the second axis is greater than or equal to 2:1. This is because after the initial shaping of the optical shaping element 6, the intensity distribution of the light beam on the two axes can be made different (with different degrees of intensity), and thus even if the optical focusing element 7 is configured as an axis-symmetric lens (i.e., the magnifications on the first and second axes are selected to be identical), and finally the light intensity on the second axis at the designated area can be changed to a Gaussian profile, and the light intensity on the first axis remains a flat-top profile.

It can be understood that the two-stage light beam "compression (i.e. shaping)" makes selection and design flexibility of the optical device in the optical system 100 significantly improved, and Gaussian profiles and flat-top profiles of different specific shapes can be obtained as well.

Thus, in a third aspect, the present disclosure provides an optical system including: a light source for emitting a light beam;
  an optical main axis;
  an optical shaping element located facing the light source and designed to shape the light beam in such a way that light intensity of the light beam has a flat-top profile on both a first axis and a second axis respectively, wherein the first axis and the second axis are oriented such that they are perpendicular to the optical main axis and to each other;
  an optical focusing element facing the optical shaping element along the optical main axis for focusing the light beam shaped by the optical shaping element to a designated area;
  wherein magnifications of the optical focusing element on the first axis and the second axis are designed in such a way that the optical focusing element has a first diffraction limit dimension on the first axis while it has a second diffraction limit dimension on the second axis, wherein at the designated area, there's a first difference between a first spot size of the light beam on the first axis and the first diffraction limit dimension which difference keeps light intensity of the light beam on the first axis as a flat-top profile, and there's a second difference between a second spot size of the light beam on the second axis and the second diffraction limit dimension which difference changes light intensity of the light beam on the second axis as a Gaussian profile, and wherein the first difference is larger than the second difference.

With the above optical system, it is possible to obtain desirable different light intensity distribution patterns/profiles on different axes by "multi-stage (for example, two-stage) compression" of light beam. This provides greater flexibility and lower design cost than the surface design of the shaping optical element surface for achieving desired light intensity distribution patterns/profiles.

Preferably, the optical shaping element may comprise freeform lens, Powell lens, cylindrical lens, tire lens (i.e. toroidal lens), a diffractive optical element, lens pair or a combination thereof. For example, the optical shaping element may be constructed as a hollow fiber, and a beam from the source can be coupled into the hollow fiber such that the intensity of the beam assumes a flat-top profile. The optical focusing element may include cylindrical lens, freeform lens, tire lens (i.e. toroidal lens), or a combination thereof.

Optically, the optical focusing element is designed as a lens group consisting of multiple lenses of different types to provide various flexible combinations for shaping the beam in order to meet optical performance requirements.

In a particularly advantageous embodiment, the optical focusing element is configured as an axis-symmetric lens, wherein the optical shaping element is designed to shape the beam in such a way that, before entering the optical focusing element, light intensity of the beam on the first axis and the second axis has a flat-top profile with difference widths, wherein the ratio of the flat-top widths on the first axis and the second axis is greater than or equal to 2:1.

By means of the axis-symmetric lens, it is possible to obtain a flat-top profile on the first axis and a Gaussian distribution on the second axis with the magnification of the optical focusing element being the same on the first and second axes, since the optical shaping element has already "pre-compressed" the light beam. That is, flat-top profiles having different flat-top widths have been produced on different axes.

Preferably, at the designated area, the light beam may be focused by the optical focusing element into a spot size with magnitude of micrometer in order to meet, for example, requirements on accuracy in detection in a flow cytometer.

Furthermore, the optical shaping element and the optical focusing element may be integrated at a fixed distance from one another which facilitates assembly of the optical system in a modular manner.

Additionally, the optical system may also include an optical collimating element disposed between the light source and the optical shaping element to provide a collimated light beam to the optical shaping element.

In one example, magnifications of the optical focusing element on the first axis and the second axis may be designed such that, at the designated area, the first spot size is greater than or equal to twice as the first diffraction limit dimension and the second spot size is less than twice as the second diffraction limit dimension.

Thereby, a simple design may be used to ensure a reliable flat-top profile of the light on the first axis, and a Gaussian profile of the light intensity on the second axis. It should be noted, however, "twice" in this feature is merely an exemplary value that clearly distinguishes between two different distribution patterns/profiles of the light intensity.

Although various embodiments of the present disclosure have been described with reference to examples of the optical system for a flow cytometer in the various figures, it should be understood that the embodiments within the scope of the present disclosure can be applied to other applications having similar structures and/or functions, such as optical systems for other biological, chemical researches, etc.

The foregoing description has set forth a number of features and advantages, including various alternative embodiments, and the structural and functional details of the apparatus and method. The description herein is intended to be exemplary and not exhaustive or limiting.

It will be apparent to those skilled in the art that various modifications can be made in the full range indicated by the broad meaning of the terms expressed in the appended claims, particularly in terms of the structure, materials, elements, components, shapes, dimensions and arrangement of the components, including the combination of thereof within the scope of the principles described herein. These various modifications do not depart from the spirit and scope of the appended claims which means that they are included herein.

The invention claimed is:

1. A flow cytometer, comprising:
a flow cell;
a light source which emits an uncollimated light beam;
an optical main axis;
an optical shaping element for shaping said light beam facing the light source and positioned directly adjacent to the light source, and wherein said optical shaping element includes a first freeform surface facing the light beam,
wherein said light beam is shaped by means of the first freeform surface of the optical shaping element such that the light beam has a light intensity profile with a flat-top profile on a first axis which is perpendicular to the optical main axis, and
wherein said light beam is shaped by said first freeform surface of the optical shaping element such that the light beam has a light intensity profile with a Gaussian profile on a second axis which is perpendicular to both the optical main axis and the first axis,
wherein the first freeform surface of the optical shaping element is configured in such a way that light passing through a point S (X, y, Z0) on an incident plane Z0 also passes through a point S'(X', y, Z0') on a designated plane Z0' wherein said point S (X, y, Z0) and said S'(X', y, Z0') meet the following equation:

$$\int_0^X I(x, y)dx = \int_0^{X'} R(x, y)dx$$

where $I(x, y) = H(z_0) \cdot e^{\frac{-2x^2}{\omega_x^2(z_0)}} \cdot e^{\frac{-2y^2}{\omega_y^2(z_0)}}$, $H(z_0) = \frac{2P}{\pi \omega_x(z_0) \omega_y(z_0)}$, $R(x, y) = T \cdot \varphi(x) e^{\frac{-2y^2}{\omega_y^2(z_0')}}$, $\varphi(x) = \begin{cases} 1, -a \leq x \leq a \\ 0, x > a \text{ or } x < -a \end{cases}$, $T = \frac{P}{\sqrt{2\pi} \, \omega_y(z_0')}$.

wherein the light beam emitted by the light source passes along the optical main axis of the optical system and through the flow cell,
wherein said flow cell includes a channel that is perpendicular to the optical main axis and the first axis.

2. The flow cytometer according to claim 1, wherein the optical system further includes focusing optic elements which are located after the optical shaping element along said optical main axis for focusing the light beam shaped by the optical shaping element to a designated area.

3. The flow cytometer according to claim 2, wherein said focusing optic elements include a concave lens and a convex lens, and wherein in a direction of the optical main axis, the concave lens is arranged more proximate to the optical shaping element than the convex lens, and the convex lens is located between the concave lens and the designated area.

* * * * *